(12) United States Patent
Maekawa et al.

(10) Patent No.: US 9,997,964 B2
(45) Date of Patent: Jun. 12, 2018

(54) WIRELESS POWER SUPPLY SYSTEM

(71) Applicant: IHI CORPORATION, Tokyo (JP)

(72) Inventors: Yuji Maekawa, Tokyo (JP); Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 396 days.

(21) Appl. No.: 14/858,272

(22) Filed: Sep. 18, 2015

(65) Prior Publication Data
US 2016/0013664 A1    Jan. 14, 2016

Related U.S. Application Data

(63) Continuation of application No. PCT/JP2014/061149, filed on Apr. 21, 2014.

(30) Foreign Application Priority Data

May 10, 2013 (JP) .................. 2013-100739
May 13, 2013 (JP) .................. 2013-101699
(Continued)

(51) Int. Cl.
*H02J 50/90* (2016.01)
*H02J 50/12* (2016.01)
(Continued)

(52) U.S. Cl.
CPC ............. *H02J 50/90* (2016.02); *B60L 11/182* (2013.01); *B60L 11/1829* (2013.01);
(Continued)

(58) Field of Classification Search
CPC .. H02J 50/90; H02J 50/12; H02J 50/50; H02J 50/70; H02J 5/005; H02J 7/025;
(Continued)

(56) References Cited

U.S. PATENT DOCUMENTS

2010/0065352 A1* 3/2010 Ichikawa .............. B60L 11/182
180/65.8
2011/0095618 A1 4/2011 Schatz et al.
(Continued)

FOREIGN PATENT DOCUMENTS

CN        2173231 Y    8/1994
CN        102882282 A  1/2013
(Continued)

OTHER PUBLICATIONS

International Search Report, PCT/JP2014/061149, dated Jun. 17, 2014, 2 pgs.

*Primary Examiner* — Brandon S Cole
(74) *Attorney, Agent, or Firm* — Volpe and Koenig, P.C.

(57) ABSTRACT

A wireless power supply system includes a power supply coil installed on the ground, an inner balloon in which a power supply coil is mounted and configured to expand and contract to adjust a vertical position of the power supply coil, and an outer balloon provided to cover both the power supply coil and the inner balloon and configured to expand to occupy a space between the power supply coil and a power receiving coil, and wirelessly supplies power from the power supply coil to the power receiving coil.

6 Claims, 17 Drawing Sheets

(30) Foreign Application Priority Data

May 16, 2013 (JP) ................................. 2013-104390
Jul. 9, 2013 (JP) ................................. 2013-143674

(51) Int. Cl.
| | |
|---|---|
| *H02J 50/50* | (2016.01) |
| *H02J 50/70* | (2016.01) |
| *H02J 17/00* | (2006.01) |
| *H02J 5/00* | (2016.01) |
| *H02J 7/02* | (2016.01) |
| *B60L 11/18* | (2006.01) |
| *H01F 38/14* | (2006.01) |
| *B60M 7/00* | (2006.01) |
| *H02J 7/00* | (2006.01) |

(52) U.S. Cl.
CPC .......... *B60L 11/1833* (2013.01); *H01F 38/14* (2013.01); *H02J 5/005* (2013.01); *H02J 7/025* (2013.01); *H02J 17/00* (2013.01); *H02J 50/12* (2016.02); *H02J 50/50* (2016.02); *H02J 50/70* (2016.02); *B60M 7/003* (2013.01); *H02J 7/0027* (2013.01); *Y02T 10/7005* (2013.01); *Y02T 10/7055* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ..... H02J 17/00; B60L 11/182; B60L 11/1829; B60L 11/1833; H01F 38/14
USPC ............................................. 307/89–111; 1/1
See application file for complete search history.

(56) References Cited

U.S. PATENT DOCUMENTS

| | | | |
|---|---|---|---|
| 2012/0194127 A1* | 8/2012 | Kobayashi | B60L 11/182 320/108 |
| 2012/0200151 A1* | 8/2012 | Obayashi | B60L 11/123 307/9.1 |
| 2012/0212069 A1 | 8/2012 | Kawano et al. | |
| 2012/0280649 A1* | 11/2012 | Jung | H02J 5/005 320/108 |
| 2013/0015699 A1 | 1/2013 | Mita | |
| 2013/0033227 A1* | 2/2013 | Gibbons, Jr. | B60L 11/1829 320/108 |
| 2013/0181667 A1* | 7/2013 | Takeshita | B60L 11/182 320/108 |
| 2014/0232202 A1* | 8/2014 | Ichikawa | H01F 38/14 307/104 |

FOREIGN PATENT DOCUMENTS

| | | |
|---|---|---|
| JP | 2009-095072 A | 4/2009 |
| JP | 2010-087353 A | 4/2010 |
| JP | 2010-098807 A | 4/2010 |
| JP | 2010-233394 A | 10/2010 |
| JP | 2012-034468 A | 2/2012 |
| JP | 4868093 B | 2/2012 |
| JP | 2012-055096 A | 3/2012 |
| JP | 2012-152075 A | 8/2012 |
| JP | 2012-174727 A | 9/2012 |
| JP | 2012-196015 A | 10/2012 |
| JP | 2013-021886 A | 1/2013 |
| JP | 2013-059239 A | 3/2013 |
| WO | 2012/169197 A1 | 12/2012 |
| WO | 2013/024395 A2 | 2/2013 |

* cited by examiner

WIRELESS POWER SUPPLY SYSTEM

This application is a continuation application based on a PCT Patent Application No. PCT/JP2014/061149, filed on Apr. 21, 2014, whose priority is claimed on Japanese Patent Application No. 2013-100739, filed on May 10, 2013, Japanese Patent Application No. 2013-101699, filed on May 13, 2013, Japanese Patent Application No. 2013-104390, filed on May 16, 2013, and Japanese Patent Application No. 2013-143674, filed on Jul. 9, 2013. The contents of the PCT application and the Japanese Patent Applications are incorporated herein by reference.

TECHNICAL FIELD

The present disclosure relates to a wireless power supply system.

BACKGROUND ART

In recent years, wireless power supply systems capable of wirelessly supplying power from a power supply side to a power receiving side without a wire (cable) connecting the power supply side and the power receiving side have been used for various purposes.

For example, a wireless power supply system has been used to supply power for charging a battery mounted in a vehicle such as an electric vehicle (EV) or a hybrid vehicle (HV) or a battery provided in a consumer appliance such as a household electrical appliance (for example, see Patent Document 1).

In such a wireless power supply system, it is necessary to appropriately set a relative positional relationship between a power supply coil (primary side coil) provided on a power supply side and a power receiving coil (secondary side coil) provided on a power receiving side so as to efficiently transmit power in a wireless manner. For example, when the battery provided in the vehicle such as the aforementioned EV or HV is charged, it is necessary to appropriately set a relative position between the power receiving coil provided in the vehicle and the power supply coil according to a stop position of the vehicle.

Patent Document 2 discloses a wireless power supply system which is provided with a relay device held in a vertically movable hold unit between the power supply coil and the power receiving coil and which prevents power transmission efficiency from being degraded due to relative position deviation between a power supply coil and a power receiving coil by moving the relay device according to a relative positions of the power supply coil and the power receiving coil. In addition, Patent Document 2 also discloses technology which is provided with a foreign object remover for removing a foreign object around a power transmission path for power transfer and which avoids a bad influence on power transfer due to the foreign object different from a power supply target.

In addition, Patent Document 3 discloses a power reception support apparatus capable of performing appropriate support in terms of correction of a position of a vehicle when power from the power supply apparatus is received. The above-described power reception support apparatus includes a power reception efficiency specifying unit configured to specify power reception efficiency of a power receiving unit at a current position of a vehicle and a support unit configured to determine whether power reception efficiency can become greater than or equal to a threshold value by adjusting a vehicle height of the vehicle when the power reception efficiency specified by the power reception efficiency specifying unit is less than the threshold value and to perform support for adjusting the height of the vehicle when it is determined that the power reception efficiency can become greater than or equal to the threshold value.

In addition, Patent Document 4 discloses a resonance type wireless power supply system for a vehicle capable of efficiently supplying power from a power supply side to a power receiving side using a vehicle height adjustment function when wireless power supply is performed for an electric motor vehicle having a vehicle height adjustment function. The above-described resonance type wireless power supply system for the vehicle includes a power supply facility having a high-frequency power supply and a primary side resonance coil and an electric motor vehicle equipped with a power receiving facility having a secondary side resonance coil configured to receive power from the primary side resonance coil and a vehicle height adjustment apparatus.

The power receiving facility includes a rectifier configured to rectify power received by the secondary side resonance coil, a secondary battery to which power rectified by the rectifier is supplied, and a control apparatus configured to perform impedance adjustment of a resonance system including the primary side resonance coil and the secondary side resonance coil using the vehicle height adjustment apparatus when the secondary battery is charged.

In addition, Patent Document 5 discloses a parking support apparatus that is provided in a vehicle capable of storing power by wirelessly receiving the power from an external power transmission unit through a power receiving unit, that enables a driver to conveniently perform charging, and that reduces a feeling of complexity of a charging operation. The above-described parking support apparatus includes a vehicle control unit configured to control the vehicle so as to adjust positions of the power transmitting unit and the power receiving unit based on a power reception situation of the power receiving unit and a height sensor for sensing a change in the height of the vehicle. The vehicle control unit performs position alignment based on an output of the height sensor and the power reception situation using a relationship between a power reception situation and a distance between the power transmitting unit and the power receiving unit predetermined according to the output of the height sensor.

In addition, Patent Document 6 discloses technology for filling a space between the power transmitting unit and the power receiving unit with a bag and preventing the intrusion of a foreign object into the aforementioned space. Further, Patent Document 7 discloses technology for detecting and removing a foreign object intruding between the power transmitting coil and the power receiving coil.

CITATION LIST

Patent Documents

[Patent Document 1]
 Japanese Unexamined Patent Application, First Publication No. 2010-87353
[Patent Document 2]
 Japanese Unexamined Patent Application, First Publication No. 2013-21886
[Patent Document 3]
 Japanese Unexamined Patent Application, First Publication No. 2010-233394

[Patent Document 4]
Japanese Unexamined Patent Application, First Publication No. 2012-34468
[Patent Document 5]
Japanese Patent No. 4868093
[Patent Document 6]
Japanese Unexamined Patent Application, First Publication No. 2012-196015
[Patent Document 7]
Japanese Unexamined Patent Application, First Publication No. 2013-59239

SUMMARY

Technical Problem

In a conventional wireless power supply system, it is necessary to increase a Q value of a resonator by appropriately setting constants of a coil and a capacitor constituting a resonator so as to realize long distance transmission (for example, about several tens of centimeters to about several meters) of power. In addition, in general, it is necessary to use a large coil so as to realize long distance transmission because a distance to which power can be wirelessly transmitted is about half of a coil diameter.

However, because a coil having large impedance and a large-capacity capacitor are necessary when a resonator having a large Q value is intended to be implemented, a wireless power supply system becomes expensive. In addition, as described above, a size of the resonator increases because a large coil is necessary to realize long distance transmission. If the technology disclosed in the above-described Patent Document 2 is used, power to be supplied from the power supply side to the power receiving side is relayed by the relay device. Thus, even when the large coil is not used, a certain degree of long distance transmission is considered to be realized. However, the wireless power supply system becomes expensive because the relay device is necessary in addition to a power receiving coil. In addition, because it is necessary to move the relay device in consideration of positions of the power supply coil and the power receiving coil, complex control is necessary for movement of the relay device.

In addition, although there is an appropriate position of the relay device for efficiently supplying power in a wireless manner in the power supply using the above-described relay device, a distance between the relay coil and the power receiving coil changes according to the height of the vehicle, and thus it is difficult to efficiently supply power from the power supply apparatus to the power receiving apparatus in a wireless manner when the relay device is embedded and fixed under the ground.

In addition, because the apparatuses disclosed in the above-described Patent Documents 3 and 4 need to include the vehicle height adjustment mechanism, there is a problem in that the vehicle becomes expensive and the configuration becomes complex. In addition, in the apparatus disclosed in Patent Document 5, the height sensor is provided on a base of the vehicle, but the height sensor is likely to be contaminated or damaged by foreign objects such as dirty mud or stones.

In addition, when a power transmission distance is a long distance in the wireless power supply system, the impedance becomes high and it is necessary to increase a power supply voltage of a power transmitting side. However, because a voltage-resistant level of a component for use in a power supply or the like is finite, the power supply voltage is limited to the voltage-resistant level of the component and it is difficult to sufficiently increase a power supply voltage of a power transmitting side. Thus, when a power transmission distance is long, it is difficult to transmit a large amount of power during a short period.

The present disclosure has been made in view of the above-described circumstances and an objective of the disclosure is to provide a wireless power supply system capable of realizing long distance transmission of power without increasing cost and size.

In addition, an objective of the present disclosure is to provide a wireless power supply system capable of wirelessly supplying power more efficiently than in the past.

In addition, an objective of the present disclosure is to enable the reduction of cost and the simplification of a configuration of a vehicle without providing a vehicle height adjustment mechanism by disposing a power supply coil and a power receiving coil which face each other at an appropriate distance at which power transmission efficiency is high and to eliminate a possibility of contamination and damage to a height sensor through foreign objects such as dirty mud or stones because the height sensor is not provided.

In addition, an objective of the present disclosure is to enable much power to be transmitted by appropriately adjusting impedance of a system in a wireless power supply system even when a distance between a power supply coil and a power receiving coil is long.

Solution to Problem

In order to solve the aforementioned problems, according to a first aspect according to a wireless power supply system of the present disclosure, a wireless power supply system including a power supply coil disposed on the ground and configured to wirelessly supply power from the power supply coil to a power receiving coil disposed above the power supply coil in includes: a first bag on which the power supply coil is mounted and configured to expand or contract to adjust a vertical position of the power supply coil; and a second bag provided to cover both the power supply coil and the first bag and configured to expand to occupy a space between the power supply coil and the power receiving coil.

In addition, according to a second aspect of the wireless power supply system of the present disclosure, in the first aspect, the wireless power supply system includes: a gas supply and exhaust apparatus configured to individually perform supply of a gas to the first bag, supply of the gas to the second bag, exhaust of the gas from the first bag, and exhaust of the gas from the second bag.

In addition, according to a third aspect of the wireless power supply system of the present disclosure, in the second aspect, the gas supply and exhaust apparatus finely adjusts the vertical position of the power supply coil by finely adjusting an amount of the gas supplied to the first bag and an amount of the gas exhausted from the first bag.

In addition, according to a fourth aspect of the wireless power supply system of the present disclosure, in the second or third aspect, the gas supply and exhaust apparatus starts the supply of the gas to the first bag after a start of the supply of the gas to the second bag when the first bag is expanded and starts the exhaust of the gas from the second bag after a start of the exhaust of the gas from the first bag when the first bag is contracted.

In addition, according to a fifth aspect of the wireless power supply system of the present disclosure, in any one of the first to fourth aspects, the wireless power supply system includes: an auxiliary bag configured to abut a periphery of the first bag and expand or contract to adjust a position within a horizontal plane of the power supply coil.

In addition, according to a sixth aspect of the wireless power supply system of the present disclosure, in the fifth aspect, the wireless power supply system includes: a hold mechanism configured to hold the auxiliary bag in the ground when the first bag is contracted and cause the auxiliary bag held in the ground to appear on the ground when the first bag is expanded.

In addition, according to a seventh aspect according to a wireless power supply system of the present disclosure, a wireless power supply system including a power supply apparatus having a power supply coil, a power receiving apparatus having a power receiving coil, and a relay coil positioned between the power supply coil and the power receiving coil, the wirelessly power supply system configured to wirelessly supply power from the power supply coil to the power receiving coil via the relay coil includes: a first bag configured to support the relay coil and expand or contract to move the relay coil between the power supply coil and the power receiving coil; and a gas supply means configured to supply a gas to the first bag.

According to an eighth aspect according to the wireless power supply system of the present disclosure, in the seventh aspect, the wireless power supply system includes: a second bag configured to expand or contract between the power supply coil and the power receiving coil, wherein the gas supply means supplies the gas to the second bag.

According to a ninth aspect according to the wireless power supply system of the present disclosure, in the seventh or eighth aspect, the wireless power supply system includes: a third bag configured to expand or contract to move the relay coil in a direction orthogonal to a direction connecting the power supply coil and the power receiving coil, wherein the gas supply means supplies the gas to the third bag.

According to a tenth aspect according to the wireless power supply system of the present disclosure, in any one of the seventh to ninth aspects, an inside of the first bag is divided when viewed in a direction connecting the power supply coil and the power receiving coil, and the gas supply means individually supplies the gas to each division region of the first bag.

According to an eleventh aspect according to a wireless power supply system of the present disclosure, a wireless power supply system including a power supply apparatus having a power supply coil and a power receiving apparatus having a power receiving coil, the wireless power supply system configured to wirelessly supply power from the power supply coil to the power receiving coil includes: a first bag configured to support the power supply coil and expand to move the power supply coil toward the power receiving coil; a spacer supported by the power supply coil and configured to abut the power receiving apparatus and cause the power supply coil and the power receiving coil to be spaced at a distance between the power supply coil and the power receiving coil and disposed to face each other; and a gas supply means configured to supply the gas to the first bag.

According to a twelfth aspect according to the wireless power supply system of the present disclosure, in the eleventh aspect, the spacer abuts a power receiving coil of the power receiving apparatus.

According to a thirteenth aspect according to the wireless power supply system of the present disclosure, in the eleventh or twelfth aspect, the power receiving apparatus is a vehicle and has a base on which the power receiving coil is provided and the spacer has a flat upper surface.

According to a fourteenth aspect according to the wireless power supply system of the present disclosure, in the thirteenth aspect, the power supply coil and the first bag are provided within a concave portion provided on a ground side of a place in which the vehicle is able to stop.

According to a fifteenth aspect according to the wireless power supply system of the present disclosure, in the fourteenth aspect, the wireless power supply system further includes: a movement restricting member provided within the concave portion and configured to restrict movement of the power supply coil.

According to a sixteenth aspect according to the wireless power supply system of the present disclosure, in any one of the eleventh to fifteenth aspects, the spacer is detachable from the power supply coil.

According to a seventeenth aspect according to a wireless power supply system of the present disclosure, a wireless power supply system including a power supply coil disposed on the ground and a power receiving coil mounted on a movable object and wirelessly supplied with power from the power supply coil includes: a second bag provided on a ground side or a movable object side and configured to expand between the power supply coil and the power receiving coil when power is supplied; and a magnetic material disposed in a magnetic path formed between the power supply coil and the power receiving coil inside the second bag that has expanded.

According to an eighteenth aspect according to the wireless power supply system of the present disclosure, the magnetic material includes a powder and the wireless power supply system includes: a magnetic material storage unit disposed in the magnetic path when the second bag has expanded, the magnetic material storage configured to store the magnetic material; and a magnetic material supply apparatus configured to supply the magnetic material to the magnetic material storage unit.

According to a nineteenth aspect according to the wireless power supply system of the present disclosure, in the eighteenth aspect, the wireless power supply system includes: a retrieving means configured to retrieve the magnetic material stored in the magnetic material storage unit to the magnetic material supply apparatus.

According to a twentieth aspect according to the wireless power supply system of the present disclosure, in the eighteenth aspect, the magnetic material storage unit includes a magnetic material storage bag configured to expand and contract together with the second bag.

Effects of the Disclosure

According to the present disclosure, a space between a power supply coil and a power receiving coil is occupied by expanding a second bag and the power supply coil is in proximity to the power receiving coil due to expansion of a first bag. Thus, it is possible to realize long distance transmission of power without increasing cost and size of the wireless power supply system.

In addition, according to the present disclosure, it is possible to wirelessly supply power more efficiently than in the past by supplying a gas to expand or contract the first bag and moving a relay coil between the power supply coil and the power receiving coil.

In addition, according to the present disclosure, the power supply coil and the power receiving coil can be spaced at a distance at which power transmission efficiency (which may be referred to hereinafter as "transmission efficiency") between the power supply coil and the power receiving coil becomes higher via a spacer by supplying a gas to expand the first bag, with the power supply coil and the power receiving coil facing each other. In addition, according to the present disclosure, the reduction of cost and the simplification of a configuration of a vehicle are possible without providing a vehicle height adjustment mechanism. In addition, because no height sensor is provided, there is no case in which the height sensor is contaminated or damaged by foreign objects such as dirty mud or stones.

In addition, the wireless power supply system of the present disclosure includes a magnetic material disposed in a magnetic path formed between a power supply coil and a power receiving coil. This magnetic material is installed in the magnetic path and magnetized, and creates a region having higher permeability than air. Through this region, magnetic resistance between the power supply coil and the power receiving coil is decreased. Therefore, according to the present disclosure, much power can be transmitted by appropriately adjusting impedance of a wireless power supply system even when a distance between a power supply coil and a power receiving coil is long.

DESCRIPTION OF EMBODIMENTS

Hereinafter, wireless power supply systems according to embodiments of the present disclosure will be described in detail with reference to the drawings. In the following drawings, dimensions of each member are appropriately adjusted such that each member has a discernible size.

First Embodiment

Figure 1:
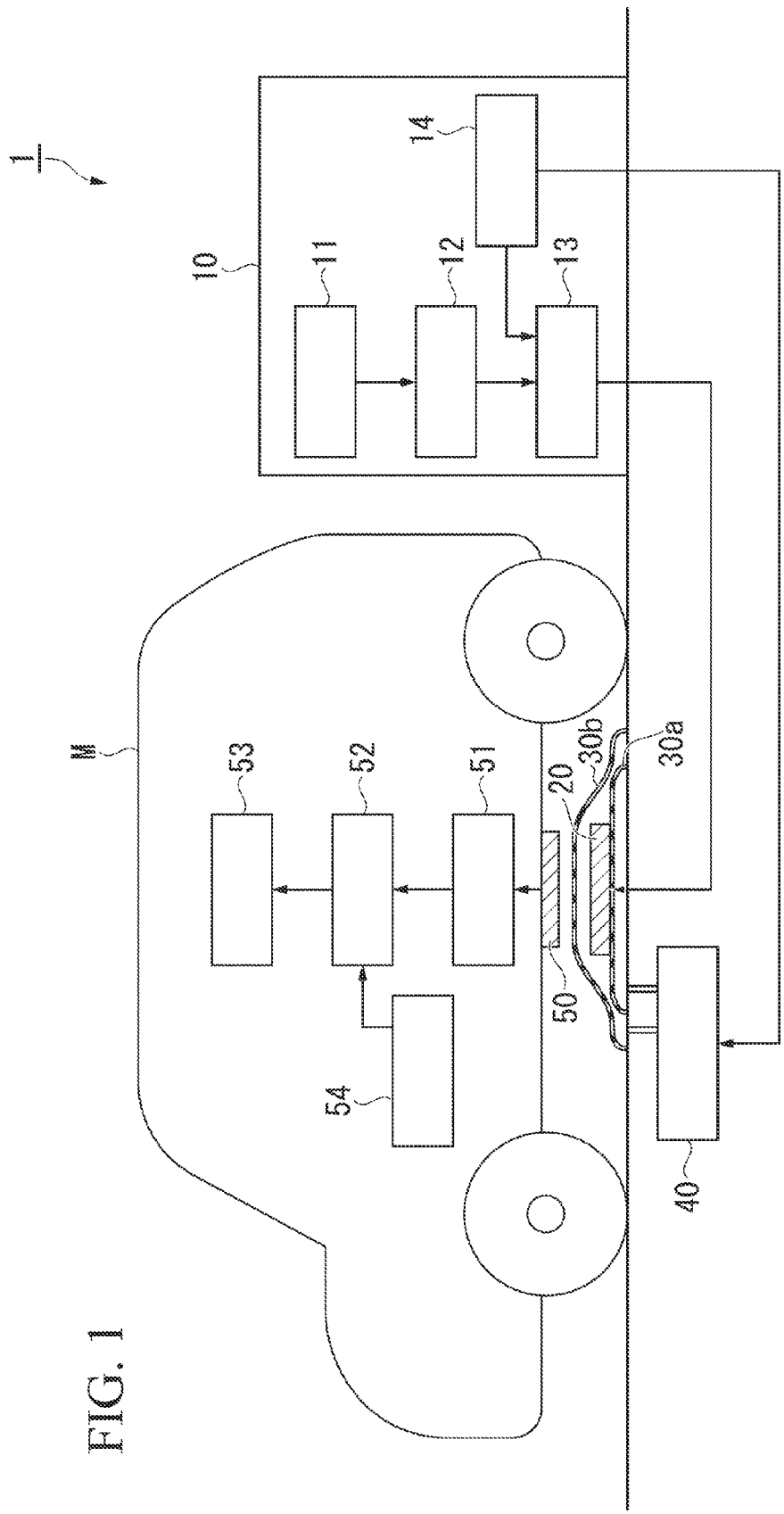
FIG. 1 is a block diagram showing a configuration of main parts of a wireless power supply system according to a first embodiment of the present disclosure.

FIG. 1 is a block diagram showing a configuration of main parts of a wireless power supply system according to the first embodiment of the present disclosure. As shown in FIG. 1, the wireless power supply system 1 includes a power supply apparatus 10, a power supply coil 20, an inner balloon 30a (first bag), an outer balloon 30b (second bag), and a power supply gas supply and exhaust apparatus 40 (a gas supply and exhaust apparatus). Power (Electric power) is wirelessly supplied to a vehicle M equipped with a battery 53. The wireless power supply system 1, for example, is installed in a power supply station, a parking lot, or the like, and wirelessly supplies power to a parked/stopped vehicle M.

The power supply apparatus 10 includes a power source 11, a rectifying circuit 12, a power supply circuit 13, and a power supply control unit 14, generates power suitable for wireless power supply to the vehicle M, and performs various types of control (details of which will be described below) necessary in performing wireless power supply to the vehicle M. Although an example in which the power supply apparatus 10 is installed on the ground in this embodiment will be described, the power supply apparatus 10 may be installed under the ground or above the vehicle M (for example, in a ceiling).

Output terminals of the power source 11 are connected to input terminals of the rectifying circuit 12, and the power source 11 supplies the rectifying circuit 12 with alternating current (AC) power necessary for power supply to the vehicle M. This power source 11, for example, is a system power source for supplying three-phase AC power of 200 V, 400 V, or the like or single-phase AC power of 100 V. The input terminals of the rectifying circuit 12 are connected to the power source 11 and output terminals thereof are connected to the power supply circuit 13. The rectifying circuit 12 rectifies the AC power supplied from the power source 11 to convert the AC power into direct current (DC) power, and outputs the DC power obtained through the conversion to the power supply circuit 13.

Input terminals of the power supply circuit 13 are connected to the rectifying circuit 12 and output terminals thereof are connected to both ends of the power supply coil 20. The power supply circuit 13 converts DC power from the rectifying circuit 12 into AC power and outputs the AC power obtained through the conversion to the power supply coil 20. Specifically, the power supply circuit 13 includes a resonance capacitor constituting a power supply side resonance circuit along with the power supply coil 20 and converts the DC power from the rectifying circuit 12 into AC power (high-frequency power) having a higher frequency than the AC power of the power source 11 to output the high-frequency power to the power supply coil 20 under control of the power supply control unit 14.

The power supply control unit 14 causes the power supply circuit 13 to generate power to be supplied to the vehicle M and causes the power supply gas supply and exhaust apparatus 40 to expand or contract the inner balloon 30a and the outer balloon 30b. Here, the power supply control unit 14 finely adjusts a vertical position of the power supply coil 20 by controlling the power supply gas supply and exhaust apparatus 40 to finely adjust an amount of the gas supplied to the inner balloon 30a and an amount of the gas exhausted from the inner balloon 30a. This power supply control unit 14 includes a central processing unit (CPU), a memory, or the like, and performs various types of control described above based on a prepared power supply control program. In addition, for example, air may be used as the gas.

The power supply coil 20 is a solenoid type coil, and wirelessly supplies power to the vehicle M by generating a magnetic field according to high-frequency power supplied from the power supply circuit 13. Both ends of the power supply coil 20 are connected to output terminals of the power supply circuit 13. The power supply coil 20 is mounted so that a coil axis is approximately horizontal on the inner balloon 30a in an exposed state or in a molded state through a non-magnetic and non-electrically-conductive material such as a plastic. Further, when a coil type is circular, the power supply coil 20 is mounted so that the coil axis becomes approximately vertical.

The inner balloon 30a is a type of balloon in which a stretchable elastic member such as rubber is formed in a film shape, and is provided to adjust a vertical position of the power supply coil 20. Specifically, the inner balloon 30a is installed on a ground surface in a state in which the power supply coil 20 is mounted on an upper portion of the center of the inner balloon 30a, and expands or contracts by supplying or exhausting the gas using the power supply gas supply and exhaust apparatus 40. The power supply coil 20 moves upward through expansion of the inner balloon 30a and the power supply coil 20 moves downward through contraction of the inner balloon 30a. Further, a plan-view shape of the inner balloon 30a is any given shape, for example, a circular shape or a rectangular shape.

The outer balloon 30b is a type of balloon in which a stretchable non-magnetic, and non-electrically-conductive elastic member such as rubber is formed in a film shape and a powder including a paramagnetic material such as aluminum powder or copper powder is attached to a portion other than an upper surface center (a portion in contact with the power receiving coil 50 to be described below and a region in which efficiency of wireless power supply is significantly degraded when a magnetic flux passing through the contact portion is affected around the contact portion). The upper surface center has both transmittivity to magnetic flux and stretchability, and the remaining portion in and to which a powder including a paramagnetic material is mixed and attached has both the ability of reducing magnetic flux leakage and stretchability.

The outer balloon 30b prevents the intrusion of a foreign object into a space between the power supply coil 20 and the power receiving coil 50 provided in the vehicle M and is provided to reduce a magnetic flux (leaked magnetic flux) radiated from a portion other than an end surface (upper surface) toward the side of the power receiving coil 50 of the power supply coil 20.

The outer balloon 30b is installed on the ground surface in a state in which both the power supply coil 20 and the inner balloon 30a are covered (contained) and expands or contracts when the gas supply or exhaust is performed by the power supply gas supply and exhaust apparatus 40. When the outer balloon 30b expands, a space between the power supply coil 20 and the power receiving coil 50 is occupied by the outer balloon 30b. Further, the plan view shape of the outer balloon 30b is any given shape as in the inner balloon 30a, for example, a circular shape or a rectangular shape.

The power supply gas supply and exhaust apparatus 40 performs the supply and exhaust of the gas for the inner balloon 30a and the outer balloon 30b under control of the power supply control unit 14. This power supply gas supply and exhaust apparatus 40 individually performs the supply of the gas to the inner balloon 30a, the supply of the gas to the outer balloon 30b, the exhaust of the gas from the inner balloon 30a, and the exhaust of the gas from the outer balloon 30b. Thus, it is possible to easily expand or contract one or both of the inner balloon 30a and the outer balloon 30b. As shown in FIG. 1, the power supply gas supply and exhaust apparatus 40 includes a gas supply and exhaust pipe communicating with the inner balloon 30a and a gas supply and exhaust pipe communicating with the outer balloon 30b, and the supply and exhaust of the gas to and from the inner balloon 30*a* and the outer balloon 30*b* are performed via the gas supply and exhaust pipes.

The vehicle M is a vehicle that is driven by a driver and runs on a road. For example, the vehicle M is an electric vehicle or a hybrid vehicle including a traction motor as a power generation source. As shown in FIG. 1, the vehicle M includes a power receiving coil 50, a power receiving circuit 51, a charging circuit 52, a battery 53, and a power reception control unit 54. Although not shown in FIG. 1, the vehicle M includes components necessary for running such as an engine, the aforementioned traction motor, an operation handle, and a brake.

The power receiving coil 50 is a solenoid coil and is provided on the bottom of the vehicle M in a posture at which wireless power supply is possible at high efficiency with the power supply coil 20. Both ends of the power receiving coil 50 are connected to input terminals of the power receiving circuit 51, and the power receiving coil 50 generates an electromotive force through electromagnetic induction when a magnetic field of the power supply coil 20 acts and outputs the generated electromotive force to the power receiving circuit 51. The sizes and shapes of the power supply coil 20 and the power receiving coil 50 may be the same or different as long as highly efficient wireless power supply is possible.

The input terminals of the power receiving circuit 51 are connected to both ends of the power receiving coil 50, and output terminals thereof are connected to input terminals of the charging circuit 52. The power receiving circuit 51 converts AC power supplied from the power receiving coil 50 into DC power to output the DC power obtained through the conversion to the charging circuit 52. This power receiving circuit 51 includes a resonance capacitor constituting a resonance circuit of a power receiving side along with the power receiving coil 50. Further, the electrostatic capacitance of the resonance capacitor of the power receiving circuit 51 is set so that a resonance frequency of the resonance circuit of the power receiving side is the same as a resonance frequency of the resonance circuit of the power supply side described above.

The input terminals of the charging circuit 52 are connected to output terminals of the power receiving circuit 51 and output terminals thereof are connected to input terminals of the battery 53. The charging circuit 52 charges the battery 53 with power (DC power) from the power receiving circuit 51. The battery 53 is a rechargeable battery (for example, a secondary battery such as a lithium ion battery or a nickel-metal hydride battery) mounted in the vehicle M, and supplies power to a traction motor (not shown) or the like. The power reception control unit 54 includes a CPU, a memory, and the like, and controls the charging circuit 52 based on a prepared power reception control program.

Figure 2:
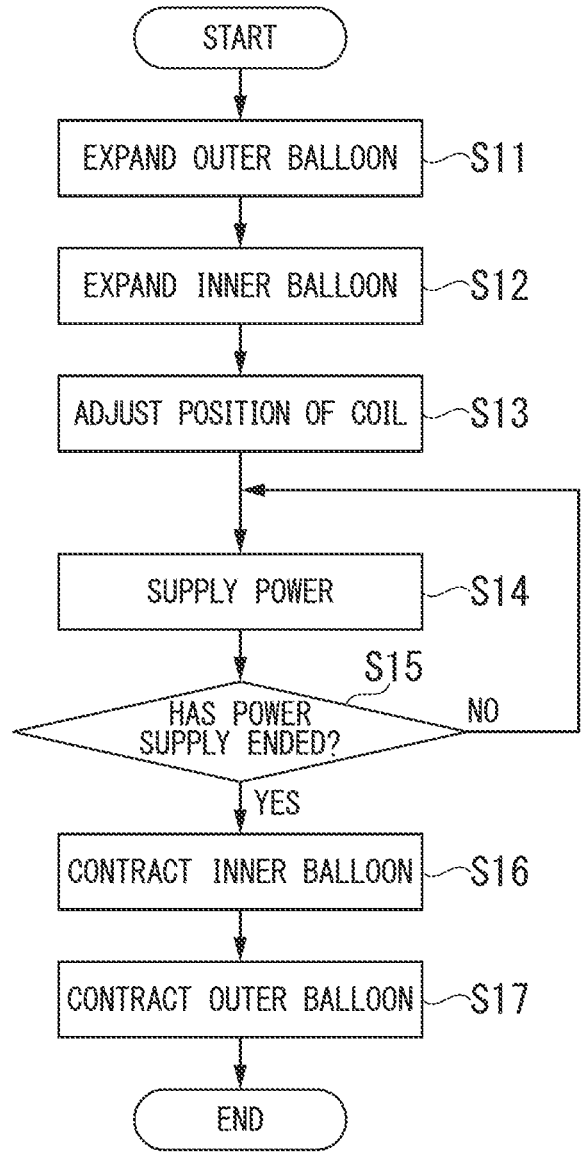
FIG. 2 is a flowchart showing an example of an operation of the wireless power supply system according to the first embodiment of the present disclosure.
Figure 3A:
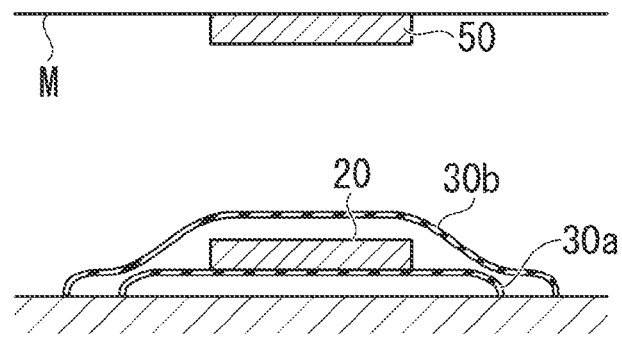
FIG. 3A is a side cross-sectional view showing the example of the operation of the wireless power supply system according to the first embodiment of the present disclosure.
Figure 3B:
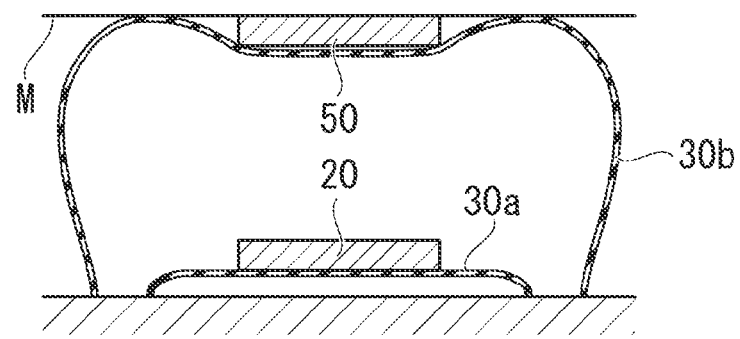
FIG. 3B is a side cross-sectional view showing the example of the operation of the wireless power supply system according to the first embodiment of the present disclosure.
Figure 3C:
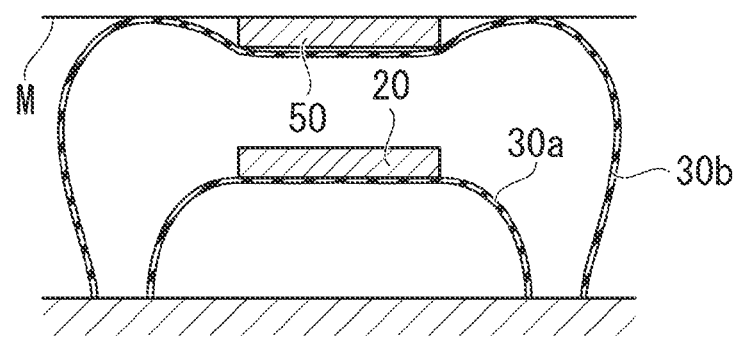
FIG. 3C is a side cross-sectional view showing the example of the operation of the wireless power supply system according to the first embodiment of the present disclosure.

Next, an operation of the wireless power supply system 1 in the above-described configuration will be described. FIG. 2 is a flowchart showing an example of the operation of the wireless power supply system according to the first embodiment of the present disclosure, and FIGS. 3A to 3C are side cross-sectional views showing the same operation. Hereinafter, operations of the vehicle M and the power supply apparatus 10 under no power supply will first be briefly described and then an operation of wirelessly supplying power from the power supply apparatus 10 to the vehicle M when the power is supplied will be described.

When no power is supplied (for example, when the vehicle M is driven by the driver normally), the power reception control unit 54 causes the charging circuit 52 to stop in the vehicle M. When no power is supplied (that is, when the vehicle M which is a power supply target is not parked/stopped at a parking/stopping position), the power supply apparatus 10 stops the power supply circuit 13 and the power supply control unit 14 causes the power supply gas supply and exhaust apparatus 40 to exhaust the gas so that the inner balloon 30*a* and the outer balloon 30*b* completely contract.

Thereafter, when the driver drives the vehicle M to move to a place in which the power supply coil 20 is installed and stops the vehicle M in that place, an installation position of the power supply coil 20 is recognized by the power reception control unit 54. Further, as a method of recognizing the installation position of the power supply coil 20, for example, there is a method of recognizing the installation position from an output of a position sensor such as a sound wave sensor or an optical sensor (not shown). When it is detected that the power receiving coil 50 of the vehicle M is disposed above the power supply coil 20 from the recognized installation position of the power supply coil 20, control of causing the charging circuit 52 to charge the battery 53 is started by the power reception control unit 54.

Even in the power supply control unit 14 of the power supply apparatus 10, the position of the vehicle M is recognized in the same way by the power supply control unit 14 from an output of a position sensor such as a sound wave sensor or an optical sensor (not shown). When it is detected that the power receiving coil 50 of the vehicle M is disposed above the power supply coil 20 from the recognized position of the vehicle M, the power supply control unit 14 first causes the gas supply or exhaust apparatus 40 for the power supply to supply the gas until the outer balloon 30*b* completely expands (step S11). That is, as shown in FIG. 3A, control of completely expanding only the outer balloon 30*b* between the inner balloon 30*a* and the outer balloon 30*b* in a completely contracted state is performed.

This control is performed so that the inner balloon 30*a* is in the completely contracted state as shown in FIG. 3B, but the outer balloon 30*b* is in a completely expanded state and a space between the power supply coil 20 and the power receiving coil 50 is occupied by the completely expanded outer balloon 30*b*. That is, the outer balloon 30*b* expands to cover the power receiving coil 50 so that the outer balloon 30*b* abuts a lower surface and a side surface of the power receiving coil 50 exposed from a base of the vehicle M. Thereby, the intrusion of a foreign object into the space between the power supply coil 20 and the power receiving coil 50 is prevented.

Next, control of expanding the inner balloon 30*a* is performed by the power supply control unit 14 by supplying the gas from the power supply gas supply and exhaust apparatus 40 to the inner balloon 30*a* (step S12). That is, as shown in FIG. 3B, control of expanding the inner balloon 30*a* in the completely contracted state contained in the outer balloon 30*b* in the completely expanded state is performed.

Further, when the inner balloon 30*a* has expanded, the gas may be exhausted from the outer balloon 30*b* by the gas supplied to the inner balloon 30*a* in accordance with the expansion of the inner balloon 30*a*.

This control is performed so that the inner balloon 30*a* is in the expanded state within the outer balloon 30*b* and the power supply coil 20 mounted in the inner balloon 30*a* moves upward as shown in FIG. 3C. Thereby, the intrusion of a foreign object into a space between the power supply coil 20 and the power receiving coil 50 from the outer balloon 30*b* is prevented and the power supply coil 20 is disposed in proximity to the power receiving coil 50.

Next, the power supply gas supply and exhaust apparatus 40 is controlled by the power supply control unit 14 and the position of the power supply coil 20 for the power receiving coil 50 is finely adjusted (step S13). Specifically, under control of the power supply control unit 14, an amount of the gas to be supplied to the inner balloon 30*a* and an amount of the gas to be exhausted from the inner balloon 30*a* are finely adjusted by the power supply gas supply and exhaust apparatus 40, so that a vertical position of the power supply coil 20 is finely adjusted. Here, the vertical position of the power supply coil 20, for example, is finely adjusted so that an amount of power supply to the vehicle M increases. Further, if it is unnecessary to finely adjust the position of the power supply coil 20, step S13 may be omitted.

When the above operation ends, the power supply circuit 13 of the power supply apparatus 10 is controlled by the power supply control unit 14, so that a power supply operation is started. Thereby, power is wirelessly supplied from the power supply coil 20 to the power receiving coil 50 of the vehicle M (step S14). When the power is wirelessly supplied, the power reception control unit 54 causes the charging circuit 52 to charge the battery 53 while monitoring a charged state of the battery 53 in the vehicle M.

When it is detected that the battery 53 is fully charged, the power reception control unit 54 performs control of stopping the charging circuit 52 and notifies an indicator (not shown) or the like (for example, an indicator indicating the full charge of the battery 53 provided in a driver seat) of the fact that the battery 53 is fully charged. Through this notification, a driver can recognize that the battery 53 is fully charged.

The power supply control unit 14 of the power supply apparatus 10 determines whether power supply has ended while the wirelessly power supply is performed (step S15). Here, a determination of whether the power supply has ended can be made, for example, based on whether an amount of power supply to the vehicle M has rapidly decreased. When it is determined that the power supply has not ended (when a determination result of step S15 is "NO"), the power supply control unit 14 causes the power supply circuit 13 to continue the wireless power supply (step S14). When it is determined that the power supply has ended (when a determination result of step S15 is "YES"), the power supply control unit 14 causes the power supply circuit 13 to stop the power supply operation.

When the power supply operation stops, the gas supplied to the inner balloon 30*a* is exhausted to the power supply gas supply and exhaust apparatus 40, and control of contracting the inner balloon 30*a* is performed by the power supply control unit 14 (step S16).

Subsequently, the gas supplied to the outer balloon 30*b* is exhausted to the power supply gas supply and exhaust apparatus 40 and control of contracting the outer balloon 30*b* is performed by the power supply control unit 14 (step S17). When the inner balloon 30*a* and the outer balloon 30*b* are contracted, the state shown in FIG. 3A is reached, and the driver can drive the vehicle M to move from an installation place of the power supply coil 20.

As shown above, in this embodiment, the inner balloon 30*a* and the outer balloon 30*b* are provided, the intrusion of a foreign object into the space between the power supply coil 20 and the power receiving coil 50 is prevented by expanding the outer balloon 30*b*, and the power supply coil 20 is caused to be in proximity to the power receiving coil 50 by expanding the inner balloon 30*a*. Thereby, because there is no foreign object between the power supply coil 20 and the power receiving coil 50 and power supply can be performed in a state in which the power supply coil 20 and the power receiving coil 50 are in proximity to each other, it is possible to realize long distance transmission of power without increasing the cost and size of the wireless power supply system 1. In addition, it is possible to cut off the leakage of a leaked magnetic flux (leakage outside the outer balloon 30*b*) radiated from the power supply coil 20.

Second Embodiment

Figure 4:
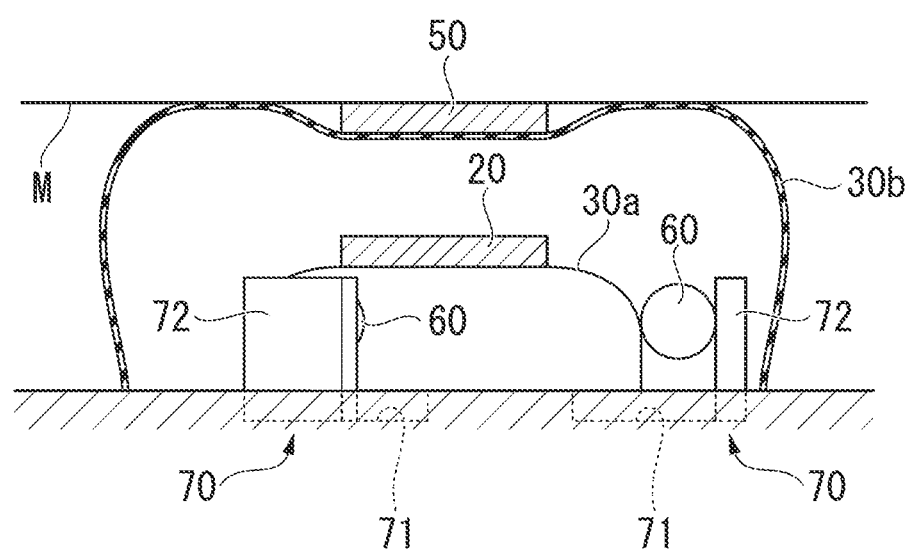
FIG. 4 is a side cross-sectional view showing an example of a configuration of main parts of a wireless power supply system according to a second embodiment of the present disclosure.

FIG. 4 is a side cross-sectional view showing an example of a configuration of main parts of a wireless power supply system according to the second embodiment of the present disclosure. Further, the entire configuration of the wireless power supply system of this embodiment is substantially similar to that of the wireless power supply system 1 shown in FIG. 1. As shown in FIG. 4, the wireless power supply system of this embodiment is a configuration obtained by adding a plurality of auxiliary balloons 60 (auxiliary bags) and a plurality of hold mechanisms 70 inside the outer balloon 30*b* (here, outside of the inner balloon 30*a*).

Figure 5A:
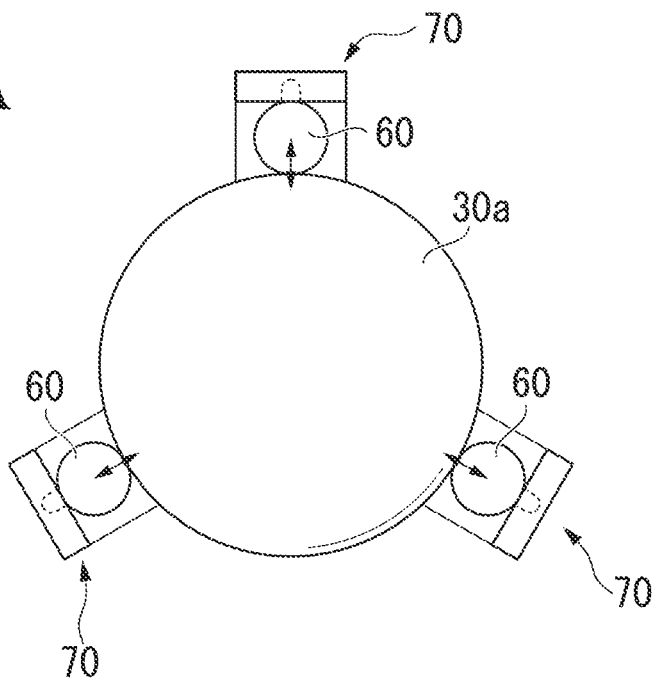
FIG. 5A is a diagram showing an auxiliary balloon and a hold mechanism in the second embodiment of the present disclosure.
Figure 5B:
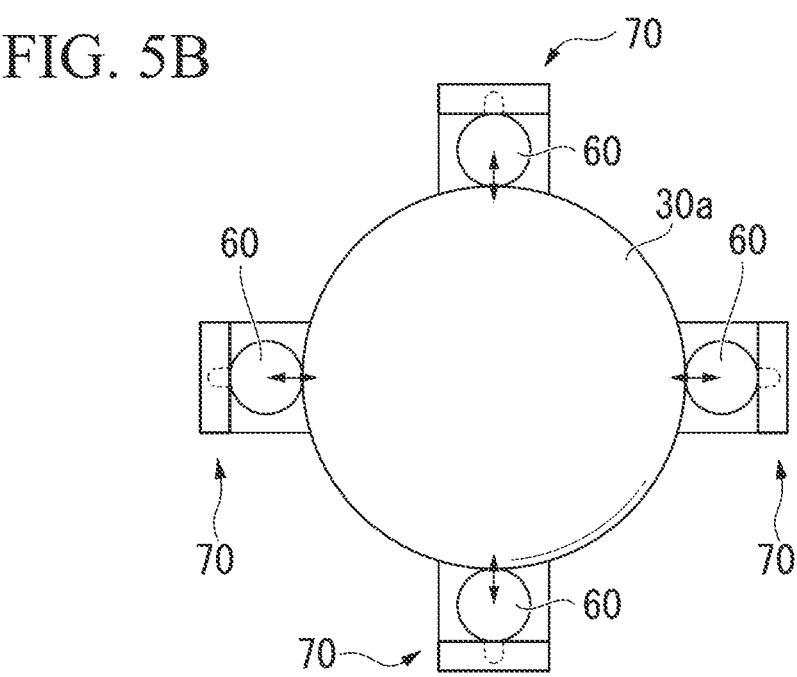
FIG. 5B is a diagram showing an auxiliary balloon and a hold mechanism in the second embodiment of the present disclosure.
Figure 5C:
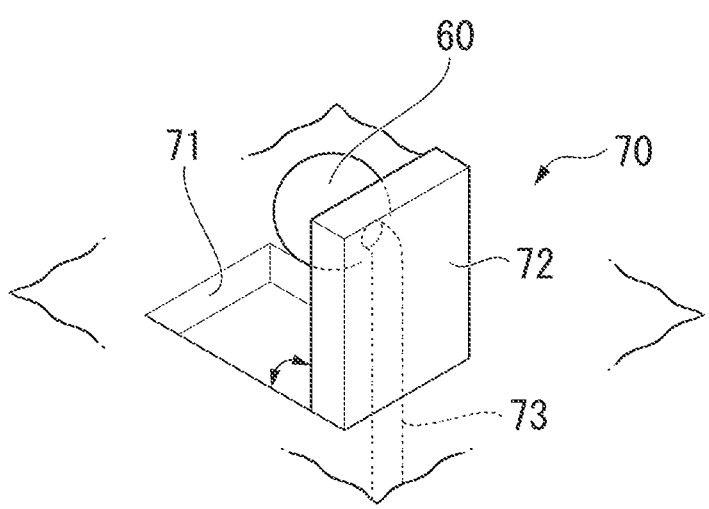
FIG. 5C is a diagram showing an auxiliary balloon and a hold mechanism in the second embodiment of the present disclosure.

FIGS. 5A to 5C are diagrams showing an auxiliary balloon and a hold mechanism in the second embodiment of the present disclosure. FIGS. 5A and 5B are plan views showing layouts of the auxiliary balloon and the hold mechanism and FIG. 5C is a perspective view showing exteriors of the auxiliary balloon and the hold mechanism. For example, as shown in FIGS. 5A and 5B, the auxiliary balloon 60 and the hold mechanism 70 are disposed at equal intervals in three or four positions around the inner balloon 30*a* with the inner balloon 30*a* as the center. In an example shown in FIG. 5A, three auxiliary balloons 60 abut three different positions of the inner balloon 30*a*. In the example shown in FIG. 5B, four auxiliary balloons 60 abut four different positions of the inner balloon 30*a*.

As in the above-described inner balloon 30*a*, the auxiliary balloon 60 is a type of balloon in which a stretchable elastic member such as rubber is formed in a film shape and is provided to adjust a position within a horizontal plane of the power supply coil 20. That is, the auxiliary balloon 60 expands or contracts, so that the position within the horizontal plane of the inner balloon 30*a*, which the auxiliary balloon 60 abuts, is adjusted and therefore the position in the horizontal plane of the power supply coil 20 mounted on the inner balloon 30*a* is adjusted.

The hold mechanism 70 holds the auxiliary balloon 60 in the ground or causes the auxiliary balloon 60 held in the ground to appear on the ground. Specifically, under control of the power supply control unit 14, the hold mechanism 70 holds the auxiliary balloon 60 in the ground when the inner balloon 30*a* contracts and causes the auxiliary balloon 60 to appear on the ground when the inner balloon 30*a* expands. This hold mechanism 70 includes a hold hole 71 and a flap 72.

The hold hole 71 is a hole in which a plan view shape formed in a ground surface to hold the auxiliary balloon 60 in the ground is a rectangular shape. The flap 72 is a member of a flat plate shape formed in the same shape as the plan view shape of the hold hole 71 and is configured to swing with respect to one end as an axis. The flap 72 is in a lowered state when the auxiliary balloon 60 is held in the ground and is in an upright state when the auxiliary balloon 60 appears on the ground. Further, when the flap 72 is in the lowered state, the hold hole 71 is covered with the flap 72.

The auxiliary balloon 60 is attached to one surface (a surface facing the base of the hold hole 71 in the lowered state) of the flap 72 and a gas supply and exhaust path 73 communicating with the auxiliary balloon 60 is formed inside the flap 72. The gas supply and exhaust path 73 is a flow path of a gas which is supplied to the auxiliary balloon 60 and exhausted from the auxiliary balloon 60. Further, this gas, for example, is supplied from the power supply gas supply and exhaust apparatus 40 or exhausted toward the power supply gas supply and exhaust apparatus 40. In addition, for example, air can be used as the gas.

Next, an operation of the wireless power supply system according to this embodiment will be described. Further, even in the wireless power supply system according to this embodiment, the operation according to the flowchart of FIG. 2 is basically performed. That is, after an operation (step S11) of expanding the outer balloon 30b, an operation (step S12) of expanding the inner balloon 30a, and an operation (step S13) of adjusting a position of the coil are sequentially performed, the wirelessly power supply is performed (step S14).

The flap 72 is in the lowered state while an operation of expanding the outer balloon 30b is performed, and the flap 72 is controlled to be in the upright state when the inner balloon 30a is expanded (step S12 is started). Then, when an operation of adjusting the position of the coil of step S13 is performed, an operation of adjusting a position within the horizontal plane of the inner balloon 30a (power supply coil 20) is also performed.

That is, the auxiliary balloon 60 is expanded until each of the auxiliary balloons 60 abuts the inner balloon 30a. In this state, a force indicated by the arrow in FIGS. 5A and 5B is applied to the inner balloon 30a when the auxiliary balloon 60 is expanded or contracted. Then, the position within the horizontal plane of the inner balloon 30a is adjusted by a resultant force of the action forces and therefore the position within the horizontal plane of the power supply coil 20 is adjusted. Further, the position of the horizontal plane of the inner balloon 30a is adjusted, for example, so that an amount of power supply to the vehicle M increases.

Then, when the power supply ends, an operation (step S16) of contracting the inner balloon 30a and an operation (step S17) of contracting the outer balloon 30b are sequentially performed. Here, the auxiliary balloon 60 is also contracted when the inner balloon 30a is contracted, and an operation of holding the auxiliary balloon 60 in the hold hole 71 by setting the flap 72 in the lowered state is performed after the inner balloon 30a is contracted.

As described above, even in this embodiment, the inner balloon 30a and the outer balloon 30b are provided, intrusion into the space between the power supply coil 20 and the power receiving coil 50 is prevented by expanding the outer balloon 30b, and the inner balloon 30a is expanded to bring the power supply coil 20 in proximity to the power receiving coil 50. Thus, as in the first embodiment, it is possible to realize long distance transmission of power without increasing the cost and size of the wireless power supply system and cut off the leakage of the leaked magnetic flux radiated from the power supply coil 20.

In addition, in this embodiment, the auxiliary balloon 60 is provided and the position within the horizontal plane of the inner balloon 30a (power supply coil 20) is adjusted. Thereby, even when the vehicle M is parked or stopped in a state in which a position deviation has occurred within the horizontal planes of the power supply coil 20 and the power receiving coil 50, it is possible to efficiently transmit power.

Also, the present disclosure is not limited to the above-described embodiment and may be freely modified within the scope of the present disclosure. For example, an example in which the inner balloon 30a is expanded after the outer balloon 30b is expanded and the outer balloon 30b is contracted after the inner balloon 30a is contracted has been described in the above-described embodiment. However, a method of expanding/contracting the inner balloon 30a and the outer balloon 30b is not limited thereto and any method may be used.

Further, although a magnetic field resonance scheme has been adopted as wireless power supply method in the above-described embodiment, an electromagnetic induction scheme may be adopted.

Third Embodiment

Figure 6:
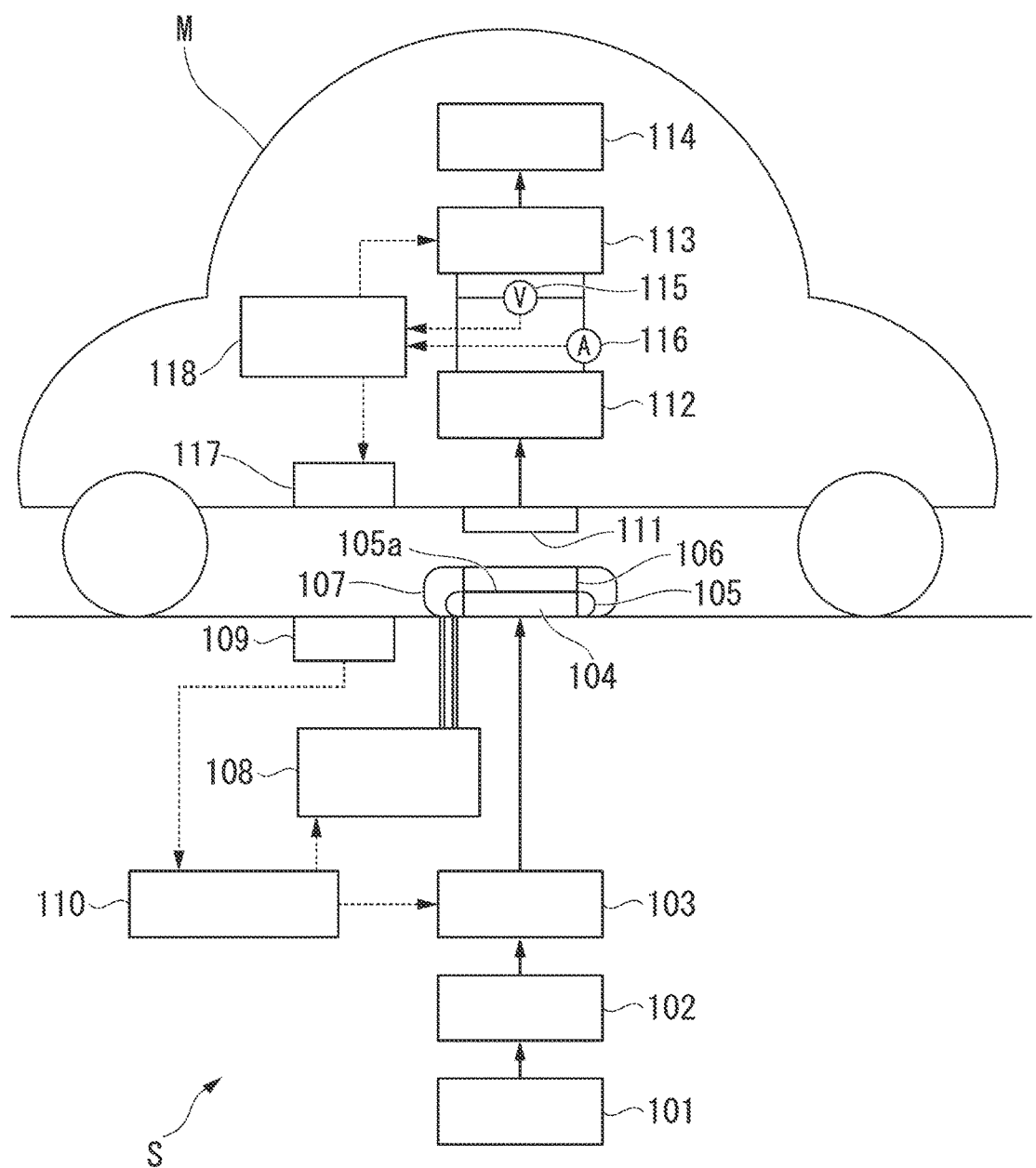
FIG. 6 is a block diagram showing a configuration of main parts of a wireless power supply system according to a third embodiment of the present disclosure.

A wireless power supply system according to this third embodiment includes a ground power supply apparatus S embedded in the ground and a vehicle M (power receiving apparatus) configured to receive power supplied from the ground power supply apparatus S as shown in FIG. 6. This wireless power supply system wirelessly supplies power from the ground power supply apparatus S to the vehicle M based on the magnetic field resonance scheme which is one of wireless power supply schemes.

The ground power supply apparatus S, for example, is embedded at a stopping position in an intersection or crossing or a parking/stopping position or the like of a parking lot, and wirelessly supplies power to the vehicle M parked/stopped at the parking/stopping position. As shown in FIG. 6, this ground power supply apparatus S includes a power source 101, a rectifying circuit 102, a power supply circuit 103, a power supply coil 104, a first bag 105, a relay coil 106, a second bag 107, a gas supply and exhaust mechanism 108, a wireless communication unit 109, and a power supply control unit 110. Also, the gas supply and exhaust mechanism 108 is a gas supply means in this embodiment.

The power source 101 is an AC power source configured to supply the rectifying circuit 102 with AC power necessary for supplying power to the vehicle M and output terminals of the power source 101 are connected to input terminals of the rectifying circuit 102. This power source 101 is, for example, a system power source or a power generation apparatus for supplying three-phase AC power of 200 V, 400 V, or the like or single-phase AC power of 100 V.

Input terminals of the rectifying circuit 102 are connected to the power source 101 and output terminals thereof are connected to the power supply circuit 103. The rectifying circuit 102 rectifies the AC power supplied from the power source 101 to convert the AC power into DC power and outputs the DC power to the power supply circuit 103. Also, the DC power source such as a solar battery may be used as the power source 101 and the rectifying circuit 102 may be omitted (that is, the DC power may be supplied from a DC power source to the power supply circuit 103).

Input terminals of the power supply circuit 103 are connected to the rectifying circuit 102 and output terminals thereof are connected to both ends of the power supply coil 104. This power supply circuit 103 includes a resonance capacitor constituting a power supply side resonance circuit along with the power supply coil 104, and is a type of inverter configured to convert the DC power supplied from the rectifying circuit 102 into AC power (high-frequency power) having a higher frequency than the AC power of the power source 101 to supply the high-frequency power to the power supply coil 104 based on a control command input from the power supply control unit 110.

The power supply coil 104 is a circular type coil or a solenoid type coil, and is installed in a parking/stopping position in a posture in which a coil axis is in a vertical direction in the case of the circular type coil, a posture in which the coil axis is in a horizontal direction in the case of the solenoid type coil, and a state in which the power supply coil 104 is exposed on the ground surface, or a state in which the power supply coil 104 is molded in a non-magnetic and non-electrically-conductive material such as a plastic, a fiber reinforced plastic, a ceramic, or a composite material thereof. Both ends of this power supply coil 104 are connected to output terminals of the power supply circuit 103. High-frequency power is supplied from the power supply circuit 103 to generate a magnetic field and therefore the power supply coil 104 wirelessly supplies power to the vehicle M.

The first bag 105 is a type of balloon in which a stretchable elastic member such as rubber is formed in a film shape, and is installed in the ground surface in a state in which the power supply coil 104 is included. In addition, the first bag 105 is installed so that the one end surface (lower surface) of the relay coil 106 is in contact with an upper side 105a, thereby supporting the relay coil 106 (see FIGS. 6, 7A, and 7B). When this first bag 105 is closed and the gas (for example, air) is supplied from the gas supply and exhaust mechanism 108, the first bag 105 expands to lift the relay coil 106 and the relay coil 106 is moved toward the power receiving coil 111 of the vehicle M to be described below. In addition, the first bag 105 is a type of balloon in which a powder including a magnetic flux shielding member of a paramagnetic material such as aluminum powder or copper powder is attached to a portion other than an upper surface center (a portion facing the power receiving coil 111 to be described below). The upper surface center has both transmittivity to magnetic flux and stretchability, and the remaining portion in and to which a powder including a magnetic flux shielding material is mixed and attached has both the ability of shielding magnetic flux and stretchability.

Figure 7A:
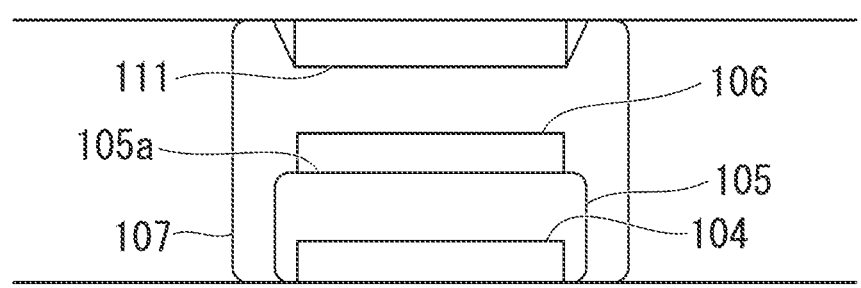
FIG. 7A is a front view showing a state in which a first bag and a second bag have expanded in the third embodiment of the present disclosure.
Figure 7B:
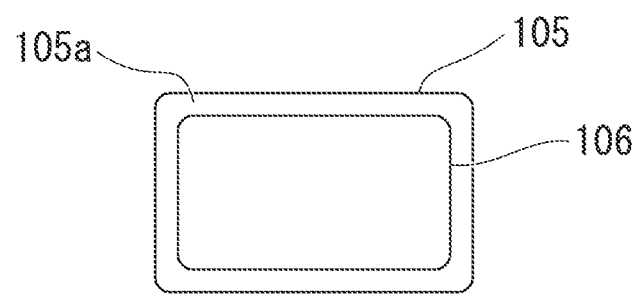
FIG. 7B is a plan view showing a state in which the first bag and the second bag have expanded in the third embodiment of the present disclosure.

The relay coil 106 includes a circular type coil or a solenoid type coil, and is supported by the first bag 105 in a posture in which a coil axis is in a vertical direction in the case of the circular type coil, a posture in which the coil axis is in a horizontal direction in the case of the solenoid type coil, and a state in which the relay coil 106 is exposed, or a state in which the relay coil 106 is molded in a non-magnetic and non-electrically-conductive material such as a plastic, a fiber reinforced plastic, a ceramic, or a composite material thereof (see FIGS. 6, 7A, and 7B). This relay coil 106 includes a resonance circuit having a resonance capacitor and a resonance coil (the above-described circular type coil or solenoid type coil), and wireless power supply is relayed from the power supply coil 104 to the power receiving coil 111 of the vehicle M to be described below. Also, the resonance frequency of the resonance circuit of the relay coil 106 is set at the same frequency as the resonance frequency of the above-described power supply side resonance circuit.

The second bag 107 is a type of balloon in which a stretchable elastic member such as rubber is formed in a film shape, and is installed on a ground surface in a state in which the first bag 105 and the relay coil 106 are included. When the second bag 107 is closed and the gas (for example, air) is supplied from the gas supply and exhaust mechanism 108, the second bag 107 expands around the first bag 105 and the relay coil 106 (see FIG. 7A). In addition, the second bag 107 is a type of balloon in which a powder including a magnetic flux shielding material of a paramagnetic material such as aluminum powder or copper powder is attached to a portion other than an upper surface center (a portion facing the power receiving coil 111 to be described later). The upper surface center has both transmittivity to magnetic flux and stretchability, and the remaining portion in and to which a powder including a magnetic flux shielding material is mixed and attached has both the ability of shielding magnetic flux and stretchability.

The gas supply and exhaust mechanism 108 is a type of pump configured to supply the gas inside the first bag 105 or the second bag 107 and exhaust the gas from the first bag 105 or the second bag 107 based on a control command input from the power supply control unit 110. This gas supply and exhaust mechanism 108 has two gas supply and exhaust pipes connected to the first bag 105 and the second bag 107.

The wireless communication unit 109 can perform wireless communication of various types of information with a wireless communication unit 117 provided in the vehicle M to be described below, and for example, receives a power amount notification output by the wireless communication unit 117 of the vehicle M. The wireless communication unit 109 can communicate with the wireless communication unit 117 when the wireless communication unit 117 of the vehicle M is located in an area within a radius of about several meters of its installation position.

The power supply control unit 110 includes a microprocessor, a memory, or the like, is a power supply control program or a functioning software type control apparatus, and controls the power supply circuit 103 and the gas supply and exhaust mechanism 108 based on the above-described power supply control program or a signal received by the wireless communication unit 109. Details of a process of this power supply control unit 110 will be described below.

The vehicle M is a vehicle that is driven by a driver and runs on a road. For example, the vehicle M is an EV or an HV using electric power as a power source. As shown in FIG. 6, the vehicle M includes a power receiving coil 111, a power receiving circuit 112, a charging circuit 113, a battery 114, a voltage sensor 115, a current sensor 116, a wireless communication unit 117, and a power reception calculation control unit 118. Also, although not shown in FIG. 6, of course, the vehicle M includes components necessary for running such as an engine, a traction motor, an operation handle, and a brake.

The power receiving coil 111 is a circular type coil or a solenoid type coil, faces the power supply coil 104 or the relay coil 106, and is installed on the bottom of the vehicle M in a posture in which a coil axis is in a vertical direction in the case of the circular type coil and a posture in which the coil axis is horizontal and parallel to the coil axis of the power supply coil 104 in the case of the solenoid type coil so that highly efficient wireless power supply is enabled via the power supply coil 104 and the relay coil 106. Both ends of the power receiving coil 111 are connected to the input terminals of the power receiving circuit 112. The power receiving coil 111 generates an electromotive force through electromagnetic induction when a magnetic field of the power supply coil 104 or the relay coil 106 acts and outputs the electromotive force to the power receiving circuit 112. Although all the power supply coil 104, the relay coil 106, and the power receiving coil 111 are of the same type, that is, circular type coils or solenoid type coils, sizes and shapes of the power supply coil 104, the relay coil 106, and the power receiving coil 111 may be the same or different as long as highly efficient wireless power supply is possible.

Input terminals of the power receiving circuit 112 is connected to both ends of the power receiving coil 111 and output terminals thereof are connected to input terminals of the charging circuit 113. The power receiving circuit 112 includes a resonance capacitor constituting the power receiving resonance circuit along with the power receiving coil 111, and is a type of rectifying circuit configured to convert AC power supplied from the power receiving coil 111 into DC power to supply the DC power to the charging circuit 113. Also, the electrostatic capacitance of the resonance capacitor of the power receiving circuit 112 is set at the same frequency as the resonance frequency of the power supply side resonance circuit and the resonance frequency of the power receiving side resonance circuit described above.

The input terminals of the charging circuit 113 are connected to output terminals of the power receiving circuit 112 and output terminals thereof are connected to input terminals of the battery 114. The charging circuit 113 charges the battery 114 with power (DC power) supplied from the power receiving circuit 112. The battery 114 is a rechargeable battery (for example, a secondary battery such as a lithium ion battery or a nickel-metal hydride battery) mounted in the vehicle M, and supplies driving power to a traction motor (not shown) or the like.

The voltage sensor 115 is provided between the power receiving circuit 112 and the charging circuit 113, detects a voltage value of power supplied from the power receiving circuit 112 to the charging circuit 113, and outputs a voltage detection signal indicating the voltage value to the power reception calculation control unit 118.

The current sensor 116 is provided between the power receiving circuit 112 and the charging circuit 113, a current value of power supplied from the power receiving circuit 112 to the charging circuit 113 is detected, and a current detection signal indicating the current value is output to the power reception calculation control unit 118.

The wireless communication unit 117 can perform wireless communication of various types of information with the wireless communication unit 109 provided in the ground power supply apparatus S, and for example, transmits a power amount notification indicating a power amount of power reception under control of the power reception calculation control unit 118. The wireless communication unit 117 can communicate with the wireless communication unit 109 when the wireless communication unit 109 of the ground power supply apparatus S is located in an area within a radius of several meters of the wireless communication unit 117 as the center.

The power reception calculation control unit 118 includes a microprocessor, a memory, and the like, and is a software type control apparatus which functions based on a power reception control program, and performs a calculation process of a power amount of power reception based on the above-described power reception calculation control program and controls the charging circuit 113. For example, the power reception calculation control unit 118 calculates a power amount output from the power receiving circuit 112, that is, calculates a power amount output from the power receiving circuit 112 by multiplying a voltage value detected by the voltage sensor 115 by a current value detected by the current sensor 116, based on a voltage detection signal input from the voltage sensor 115 and a current detection signal input from the current sensor 116.

Next, an operation of this wireless power supply system configured as described above will be described.

First, operations of the vehicle M and the ground power supply apparatus S under no power supply will be described. The power reception calculation control unit 118 of the vehicle M stops the charging circuit 113 when no power is supplied (for example, when the driver performs normal driving of the vehicle M). The power supply control unit 110 of the ground power supply apparatus S stops the power supply circuit 103 when no power is supplied, that is, when the vehicle M which is a power supply target is not stopped at a parking/stopping position, and causes the gas supply and exhaust mechanism 108 to exhaust the gas within the first bag 105 and the second bag 107 so that the first bag 105 and the second bag 107 completely contract.

Thereafter, the driver drives the vehicle M to move the vehicle M to an installation place of the ground power supply apparatus S and stops the vehicle M in that place. The power reception calculation control unit 118 of the vehicle M recognizes an installation position of the ground power supply apparatus S based on a result of communication with the wireless communication unit 109 of the ground power supply apparatus S by the wireless communication unit 117 (or an output of a position sensor such as a sound wave sensor or an optical sensor (not shown)). For example, the power reception calculation control unit 118 recognizes the installation position of the ground power supply apparatus S based on the strength of a signal received from the wireless communication unit 109 of the ground power supply apparatus S by the wireless communication unit 117. Subsequently, the power reception calculation control unit 118 causes the charging circuit 113 to start a charging operation when it is detected that the vehicle M has moved above the ground power supply apparatus S.

As in the vehicle M, the power supply control unit 110 of the ground power supply apparatus S recognizes the position of the vehicle M based on a result of communication with the wireless communication unit 109 of the ground power supply apparatus S by the wireless communication unit 117 (or an output of a position sensor such as a sound wave sensor or an optical sensor (not shown)). When it is detected that the vehicle M has moved above the ground power supply apparatus S, the power supply control unit 110 causes the gas supply and exhaust mechanism 108 to supply the gas so that the second bag 107 completely expands. Through the above-described operation, as shown in FIG. 7A, the second bag 107 of the ground power supply apparatus S comes in contact with and covers the power receiving coil 111 of the vehicle M. Also, the power supply control unit 110 determines whether the second bag 107 has completely expanded based on a time of gas supply by the gas supply and exhaust mechanism 108 or a detection result of a pressure gauge (not shown) provided in a supply port of a pump for the second bag 107.

Subsequently, when the second bag 107 completely expands, the power supply control unit 110 causes the gas supply and exhaust mechanism 108 to start the supply of a gas to the first bag 105 and causes the power supply circuit 103 to start a power supply operation of low power. Also, the low power is set to a power value less than large power for charging to be supplied through the ground power supply apparatus S thereafter.

The power reception calculation control unit 118 of the vehicle M calculates a power amount of low power output from the power receiving circuit 112 by multiplying a voltage value detected by the voltage sensor 115 by a current value detected by the current sensor 116, and causes the wireless communication unit 117 to transmit a power amount notification to notify of the power amount.

The power supply control unit 110 of the ground power supply apparatus S determines whether the power amount indicated by the power amount notification received by the wireless communication unit 109 has increased, and causes the gas supply and exhaust mechanism 108 to continuously supply the gas to the first bag 105 when it is determined that the power amount has increased. Then, the power supply control unit 110 determines whether the power amount has increased again and causes the gas supply and exhaust mechanism 108 to continuously supply the gas to the first bag 105 when it is determined that the power amount has increased. On the other hand, when it is determined that the increase of the power amount has stopped, the power supply control unit 110 causes the gas supply and exhaust mechanism 108 to stop the supply of the gas to the first bag 105.

On the other hand, when it is determined that the power amount has decreased, the power supply control unit 110 causes the gas supply and exhaust mechanism 108 to exhaust the gas from the first bag 105 by stopping the gas supply to the first bag 105 by the gas supply and exhaust mechanism 108. Then, the power supply control unit 110 determines whether the power amount of low power received by the vehicle M has increased again and causes the gas supply and exhaust mechanism 108 to continuously exhaust the gas from the first bag 105 when it is determined that the power amount has increased. On the other hand, the power supply control unit 110 causes the gas supply and exhaust mechanism 108 to stop the exhaust of the gas from the first bag 105 when it is determined that the increase of the power amount has stopped.

That is, the power supply control unit 110 controls the gas supply and exhaust mechanism 108 so that the first bag 105 expands or contracts based on a power amount notification received by the wireless communication unit 109. Thereby, the relay coil 106 moves between the power supply coil 104 and the power receiving coil 111 of the vehicle M through the first bag 105 and stops at a position, at which transmission efficiency between the power supply coil 104 and the power receiving coil 111 is optimized, through the stop of expansion or contraction of the first bag 105.

Subsequently, the power supply control unit 110 causes the power supply circuit 103 to start the power supply operation. Here, because the relay coil 106 is at a position at which the transmission efficiency between the power supply coil 104 and the power receiving coil 111 is optimized, power is supplied from the power supply coil 104 to the power receiving coil 111 at high transmission efficiency. In addition, because a space between the power supply coil 104 and the power receiving coil 111 is occupied by the second bag 107, it is possible to prevent a foreign object from intruding between the power supply coil 104 and the power receiving coil 111.

In addition, a corresponding portion of the second bag 107 in an expanded state just above an end surface (upper surface) of the relay coil 106 can be formed as a magnetic-flux-transmissive member (for example, a member having a surface of a film-like elastic material to which a powder of high permeability material such as ferrite is attached) through which a magnetic flux passes, and the other portion can be formed as a magnetic flux shielding member (a member having a surface of a film-like elastic material to which a paramagnetic powder including a magnetic flux shielding material such as aluminum powder or copper powder is attached). In this case, it is possible to reduce the leaked magnetic flux more than in the past because the leaked magnetic flux is prevented from being leaked outside the second bag 107.

The power reception calculation control unit 118 of the vehicle M causes the charging circuit 113 to appropriately charge the battery 114 while monitoring a charged state of the battery 114. When it is detected that the battery 114 is fully charged, the power reception calculation control unit 118 notifies that the battery 114 is fully charged through an indicator (not shown) or the like. Then, when the driver recognizes the full charge through the indicator (not shown) or the like, he/she drives the vehicle M to move from the installation position of the ground power supply apparatus S.

When it is detected through communication of the wireless communication unit 109 with the wireless communication unit 117 of the vehicle M (or an output of a position sensor such as a sound wave sensor or an optical sensor (not shown)) that the vehicle M has moved, the power supply control unit 110 of the ground power supply apparatus S stops control of the power supply circuit 103 and causes the gas supply and exhaust mechanism 108 to completely contract the first bag 105 and the second bag 107.

According to this embodiment, it is possible to wirelessly supply power more efficiently than in the past by supplying a gas to expand or contract the first bag 105 and moving the relay coil 106 between the power supply coil 104 and the power receiving coil 111. In addition, according to this embodiment, it is possible to prevent a foreign object from intruding between the power supply coil 104 and the power receiving coil 111 because a space between the power supply coil 104 and the power receiving coil 111 is occupied by the second bag 107.

In addition, according to this embodiment, it is possible to reduce the leaked magnetic flux more than in the past because the leaked magnetic flux is prevented from being leaked outside the second bag 107 when the second bag 107 has a corresponding portion just above an end surface (upper surface) of the relay coil 106 formed as a magnetic-flux-transmissive member through which a magnetic flux passes in an expanded state and the other portion formed as a magnetic flux shielding member.

Fourth Embodiment

Next, a wireless power supply system according to the fourth embodiment will be described.

Figure 8A:
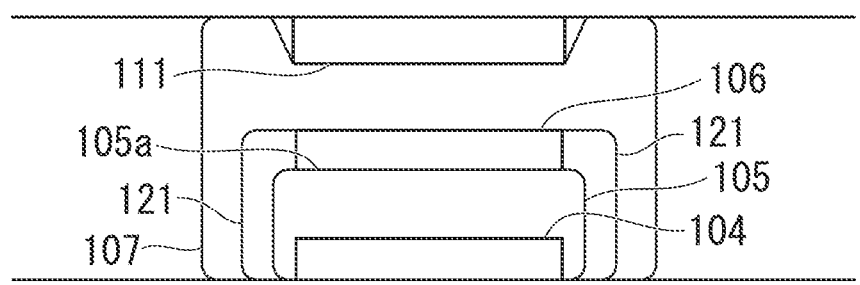
FIG. 8A is a front view showing a state in which a first bag, a second bag, and a third bag have expanded in a fourth embodiment of the present disclosure.

The wireless power supply system according to this fourth embodiment is different from that of the above-described third embodiment in that third bags 121 (shown in FIGS. 8A and 8B) are provided and a gas is supplied from a gas supply and exhaust mechanism 108 to the third bags 121. The other components are similar to those of the third embodiment. Therefore, description of similar components to the third embodiment will be omitted in the fourth embodiment.

Figure 8B:
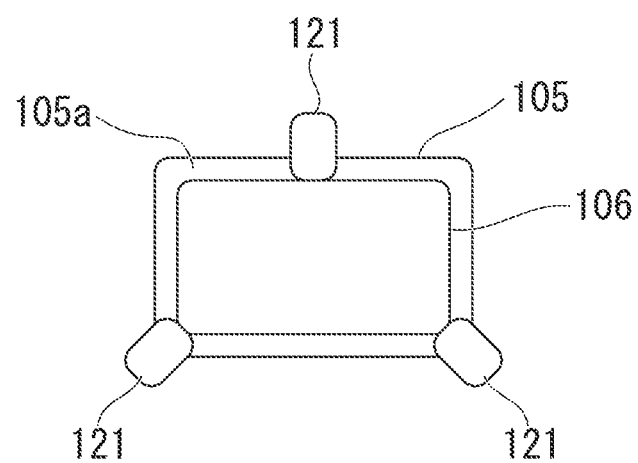
FIG. 8B is a plan view showing a state in which the first bag, the second bag, and the third bag have expanded in the fourth embodiment of the present disclosure.

As shown in FIG. 8B, for example, three third bags 121 are installed on a ground surface around a first bag 105. In addition, when the third bags 121 are closed and the gas (for example, air) is supplied from the gas supply and exhaust mechanism 108, each third bag 121 is formed in a shape in which a tip of the third bag 121 abuts the peripheral surface of the relay coil 106. Also, it is desirable that the number of third bags 121 be three or more.

The gas supply and exhaust mechanism 108 supplies the gas into the third bags 121 and exhausts the gas from the third bags 121 in addition to the first bag 105 and the second bag 107. That is, the gas supply and exhaust mechanism 108 has three gas supply and exhaust pipes connected to each of the third bags 121 in addition to the first bag 105 and the second bag 107.

Next, an operation of this fourth embodiment configured as described above will be described. Also, description of a similar operation to the third embodiment will be omitted.

When control of the gas supply and exhaust mechanism 108 for expanding or contracting the first bag 105 is completed, a power supply control unit 110 of the ground power supply apparatus S causes the gas supply and exhaust mechanism 108 to start the supply of the gas to the third bags 121.

Here, the power supply control unit 110 controls the gas supply and exhaust mechanism 108 so that each third bag 121 expands or contracts based on a power amount notification received by a wireless communication unit 109. That is, the power supply control unit 110 causes the gas supply and exhaust mechanism 108 to expand or contract each third bag 121 until an increase of a power amount indicated by the power amount notification stops.

When the tip of the third bag 121 in the expanded state abuts the peripheral surface of the relay coil 106, the relay coil 106 moves horizontally (in a direction orthogonal to a direction connecting the power supply coil 104 and the power receiving coil 111) according to the degree to which it is abutted by third bags 121. That is, the relay coil 106 moves horizontally according to an amount of supply of a gas to the third bags 121 by the gas supply and exhaust mechanism 108, and stops at a position, at which transmission efficiency is optimized, through the stop of expansion or contraction of the third bags 121.

Subsequently, the power supply control unit 110 causes the power supply circuit 103 to start a power supply operation. Here, because the relay coil 106 is at a position at which transmission efficiency between the power supply coil 104 and the power receiving coil 111 is optimized, power is supplied from the power supply coil 104 to the power receiving coil 111 at high transmission efficiency.

A power reception calculation control unit 118 of the vehicle M causes the charging circuit 113 to appropriately charge a battery 114 while monitoring a charged state of the battery 114. When it is detected that the battery 114 is fully charged, the power reception calculation control unit 118 notifies that the battery 114 is fully charged through an indicator (not shown) or the like. Then, when the driver recognizes the full charge through the indicator (not shown) or the like, he/she drives the vehicle M to move from the installation position of the ground power supply apparatus S.

When it is detected through communication of the wireless communication unit 109 with the wireless communication unit 117 of the vehicle M (or an output of a position sensor such as a sound wave sensor or an optical sensor (not shown)) that the vehicle M has moved, the power supply control unit 110 of the ground power supply apparatus S stops control of the power supply circuit 103 and causes the gas supply and exhaust mechanism 108 to completely contract the third bags 121 in addition to the first bag 105 and the second bag 107.

According to this embodiment, it is possible to wirelessly supply power more efficiently than in the past by supplying the gas to expand or contract the third bags 121 and moving the relay coil 106 in the horizontal direction.

Fifth Embodiment

Next, a wireless power supply system according to the fifth embodiment will be described.

Figure 9A:
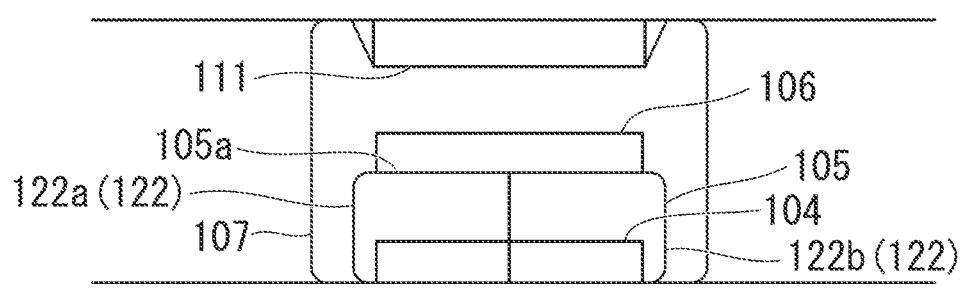
FIG. 9A is a front view showing a state in which a first bag and a second bag have expanded in a fifth embodiment of the present disclosure.
Figure 9B:
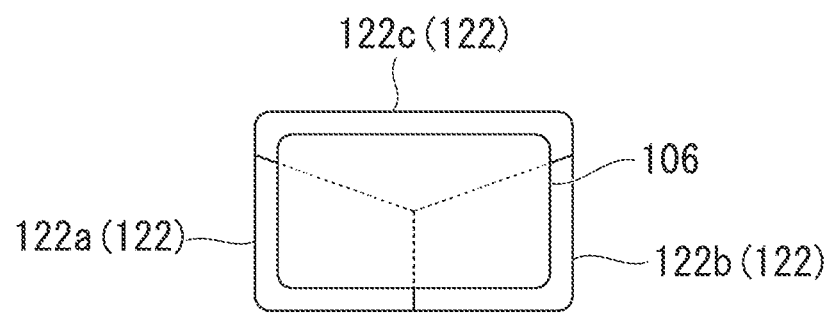
FIG. 9B is a plan view showing a state in which the first bag and the second bag have expanded in the fifth embodiment of the present disclosure.

The wireless power supply system according to this fifth embodiment includes a first bag 122 (see FIGS. 9A and 9B), instead of the first bag 105, that is internally divided when viewed in a direction connecting the power supply coil 104 and the power receiving coil 111, and is different from the above-described third embodiment in that a gas is supplied from a gas supply and exhaust mechanism 108 for division regions 122a, 122b, and 122c of the first bag 122. The other components are similar to those of the third embodiment. Therefore, description of similar components to the third embodiment will be omitted in the fifth embodiment.

The first bag 122, for example, is internally divided into three regions (division regions 122a, 122b, and 122c) when viewed in a direction connecting the power supply coil 104 and the power receiving coil 111. In addition, the division regions 122a, 122b, and 122c of the first bag 122 are closed, expand to lift a relay coil 106 when the gas (for example, air) is supplied from the gas supply and exhaust mechanism 108, and change a tilt of the relay coil 106 according to a difference in expansion.

The gas supply and exhaust mechanism 108 supplies the gas inside the division regions 122a, 122b, and 122c of the first bag 122 and the second bag 107 and exhausts the gas from the division regions 122a, 122b, and 122c of the first bag 122 and the second bag 107. That is, the gas supply and exhaust mechanism 108 has four gas supply and exhaust pipes connected to each of the division regions 122a, 122b, and 122c of the first bag 122 and the second bag 107.

Next, an operation of the fifth embodiment configured as described above will be described. Also, description of a similar operation to the third embodiment will be omitted.

When the second bag 107 completely expands, the power supply control unit 110 causes the gas supply and exhaust mechanism 108 to start the supply of a gas to the division regions 122a, 122b, and 122c of the first bag 122 and causes the power supply circuit 103 to start a power supply operation of low power.

Then, the power supply control unit 110 causes the gas supply and exhaust mechanism 108 to expand or contract the division regions 122a, 122b, and 122c of the first bag 122 based on a power amount notification received by the wireless communication unit 109. That is, until an increase of the power amount indicated by the power amount notification stops, the power supply control unit 110 causes the gas supply and exhaust mechanism 108 to expand or contract each third bag 121.

Thereby, the relay coil 106 moves between the power supply coil 104 and the power receiving coil 111 of the vehicle M through the division regions 122a, 122b, and 122c, a tilt of the relay coil 106 changes according to a difference in the expansion of the division regions 122a, 122b, and 122c, and the relay coil 106 stops at a position, at which transmission efficiency is optimized, through the stop of expansion or contraction of the third bag 121.

Subsequently, the power supply control unit 110 causes the power supply circuit 103 to start the power supply operation. Here, because the relay coil 106 is at the position at which the transmission efficiency between the power supply coil 104 and the power receiving coil 111 is optimized, power is supplied from the power supply coil 104 to the power receiving coil 111 at high transmission efficiency.

The power reception calculation control unit 118 of the vehicle M causes the charging circuit 113 to appropriately charge the battery 114 while monitoring a charged state of the battery 114. When it is detected that the battery 114 is fully charged, the power reception calculation control unit 118 notifies that the battery 114 is fully charged through an indicator (not shown) or the like. Then, when the driver recognizes the full charge through the indicator (not shown) or the like, he/she drives the vehicle M to move from the installation position of the ground power supply apparatus S.

When it is detected through communication of the wireless communication unit 109 with the wireless communication unit 117 of the vehicle M (or an output of a position sensor such as a sound wave sensor or an optical sensor (not shown)) that the vehicle M has moved, the power supply control unit 110 of the ground power supply apparatus S stops control of the power supply circuit 103 and causes the gas supply and exhaust mechanism 108 to completely contract the division regions 122a, 122b, and 122c of the first bag 122 and the second bag 107.

According to this embodiment, it is possible to wirelessly supply power more efficiently than in the past by supplying the gas to expand or contract the division regions 122a, 122b, and 122c of the first bag 122 and changing the tilt of the relay coil 106.

The present disclosure is not limited to the above-described embodiment, and, for example, the following modifications are considered.

(1) The first bag 105, the relay coil 106, the second bag 107, the gas supply and exhaust mechanism 108, the third bag 121, and the first bag 122 are attached to the ground power supply apparatus S in the above-described third to fifth embodiments, but may be configured to be attached to the vehicle M.

(2) The number of relay coils 106 is one in the above-described third to fifth embodiments, but the present disclosure is not limited thereto. For example, when a distance between the power supply coil 104 and the power receiving coil 111 is long and it is difficult to sufficiently supply power in a wireless manner with one relay coil 106, a plurality of relay coils 106 may be disposed in a row along a direction connecting the power supply coil 104 and the power receiving coil 111. In this case, the first bag 105, the third bag 121, or the first bag 122 is provided for each relay coil 106.

(3) Although the present disclosure is applied to a wireless power supply system in which the power supply coil 104, the relay coil 106, and the power receiving coil 111 are provided in a posture in which a coil axis is in a vertical direction in the above-described third to fifth embodiments, the present disclosure is not limited thereto. For example, the present disclosure may be applied to a wireless power supply system in which the power supply coil 104, the relay coil 106, and the power receiving coil 111 are provided in a posture (horizontal posture) in which a coil axis is in a horizontal direction or a posture in which the coil axis is tilted.

(4) In the above-described third to fifth embodiments, the power supply apparatus is the ground power supply apparatus S embedded in the ground surface and the power receiving apparatus is the vehicle M which runs on the ground surface. However, the present disclosure is not limited thereto. For example, the power supply apparatus may be an underwater power supply apparatus installed underwater and the power receiving apparatus may be an autonomous underwater vehicle which moves underwater. In addition, the above-described autonomous underwater vehicle should externally extract water quality data when underwater water quality or the like is investigated. In this case, a communication antenna may be provided inside any one of the first bag 105, the second bag 107, the third bag 121, and the first bag 122 provided in the autonomous underwater vehicle and the underwater power supply apparatus and water quality data may be externally extracted via the communication antenna.

That is, the underwater power supply apparatus is connected to a water quality data management apparatus or the like on the ground via a communication cable, the autonomous underwater vehicle wirelessly transmits the water quality data to the underwater power supply apparatus via the communication antenna when the autonomous underwater vehicle transmits power (when the battery 114 is charged), and the underwater power supply apparatus may perform wired transmission on water quality data received from the underwater vehicle via the communication antenna to the water quality data management apparatus or the like.

In addition, a fluid to be supplied inside the first bag 105, the second bag 107, the third bag 121, or the first bag 122 may be a liquid instead of a gas. In particular, in the case of a magnetic field resonance scheme, the liquid may be a certain liquid (for example, saltwater) having an ion property as long as the liquid has a property that it does not damage the coil or the bags, and may be distilled water, an alcohol, or the like. In particular, because specific gravities of gases and liquids are different, it is possible to adjust a balance of the weight of the power supply apparatus or the power receiving apparatus using a gas and a liquid together.

Sixth Embodiment

Figure 10:
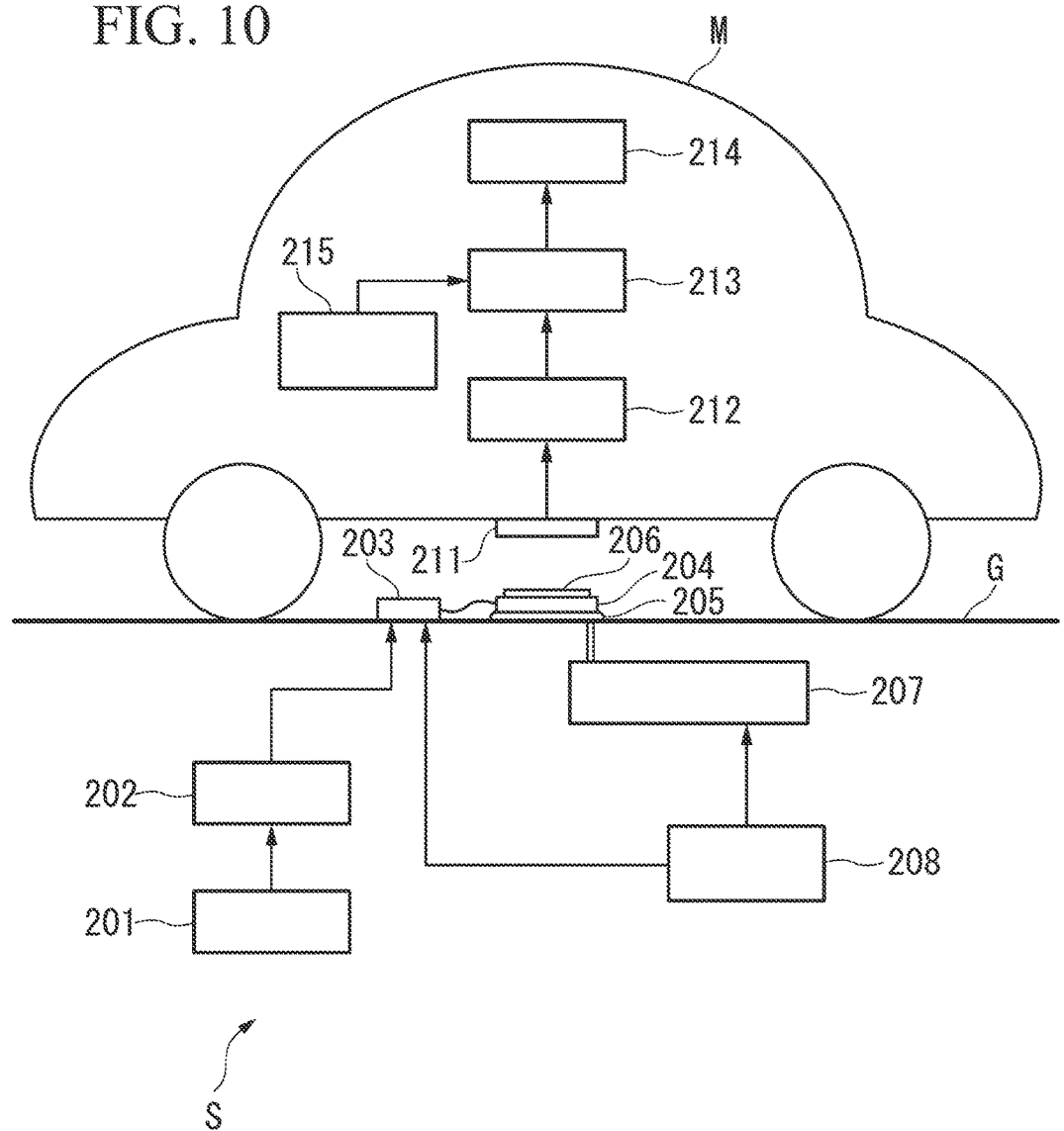
FIG. 10 is a block diagram showing a functional configuration of a wireless power supply system according to a sixth embodiment of the present disclosure.

As shown in FIG. 10, a wireless power supply system according to this sixth embodiment includes a ground power supply apparatus S (power supply apparatus) embedded in a ground surface G and a vehicle M (power receiving apparatus) configured to receive power from the ground power supply apparatus S. This wireless power supply system wirelessly supplies power from the ground power supply apparatus S to the vehicle M based on a magnetic field resonance scheme which is one of wireless power supply schemes.

The ground power supply apparatus S, for example, is embedded at a stopping position in an intersection or crossing or a parking/stopping position or the like of a parking lot, and wirelessly supplies power to the vehicle M parked/stopped at the parking/stopping position. As shown in FIG. 10, this ground power supply apparatus S includes a power source 201, a rectifying circuit 202, a power supply circuit 203, a power supply coil 204, a bag (first bag) 205, a spacer 206, a gas supply and exhaust mechanism 207, and a power supply control unit 208. Also, the gas supply and exhaust mechanism 207 is a gas supply means in this embodiment.

The power source 201 is an AC power source configured to supply the rectifying circuit 202 with AC power necessary for supplying power to the vehicle M and output terminals of the power source 201 are connected to input terminals of the rectifying circuit 202. This power source 201 is, for example, a system power source or a power generation apparatus for supplying three-phase AC power of 200 V, 400 V, or the like or single-phase AC power of 100 V.

Input terminals of the rectifying circuit 202 are connected to the power source 201 and output terminals thereof are connected to the power supply circuit 203. The rectifying circuit 202 rectifies the AC power supplied from the power source 201 to convert the AC power into DC power and outputs the DC power to the power supply circuit 203. Also, the DC power source such as a solar battery may be used as the power source 201 and the rectifying circuit 202 may be omitted (that is, the DC power may be supplied from a DC power source to the power supply circuit 203). Also, the power source 201 and the rectifying circuit 202 may be separated from the power supply circuit 203 and installed without being embedded in the ground surface G.

Input terminals of the power supply circuit 203 are connected to the rectifying circuit 202 and output terminals thereof are connected to both ends of the power supply coil 204. This power supply circuit 203 includes a resonance capacitor constituting a power supply side resonance circuit along with the power supply coil 204, and is a type of inverter configured to convert the DC power supplied from the rectifying circuit 202 into AC power (high-frequency power) having a higher frequency than the AC power of the power source 201 to supply the high-frequency power to the power supply coil 204 based on a control command input from the power supply control unit 208. In addition, the power supply circuit 203 is installed on the ground surface G of the parking/stopping position and connected to the power supply coil 204 through a flexible electric cable. Also, the power supply circuit 203 may be embedded in the ground surface G rather than on the ground surface G or may be installed by separating the power supply circuit 203 from the ground surface G by extending the flexible electric cable.

Figure 11A:
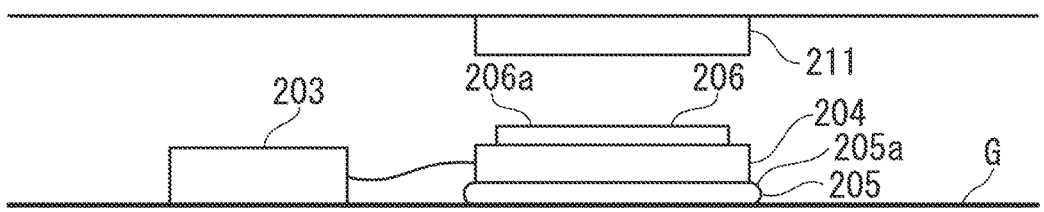
FIG. 11A is a side cross-sectional view of a first bag and a spacer in the sixth embodiment of the present disclosure.
Figure 11B:
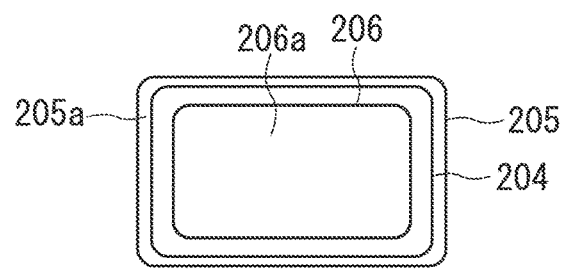
FIG. 11B is a plan view of a spacer in the sixth embodiment of the present disclosure.
Figure 12:
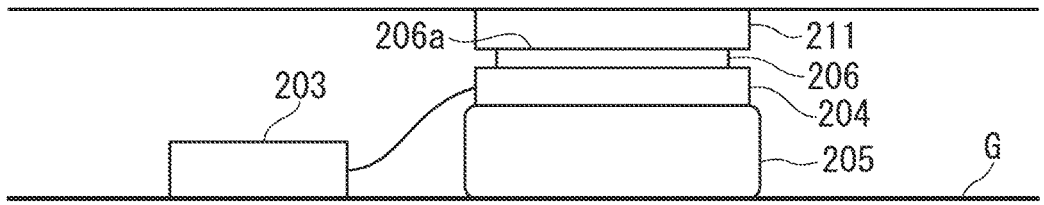
FIG. 12 is a side view showing a state in which the first bag has expanded in the sixth embodiment of the present disclosure.

The power supply coil 204 is a circular type coil or a solenoid type coil, and is supported by the bag 205 in a posture in which a coil axis is in a vertical direction in the case of the circular type coil, a posture in which the coil axis is in a horizontal direction in the case of the solenoid type coil, and a state in which the power supply coil 204 is exposed, or a state in which the power supply coil 204 is molded in a non-magnetic and non-electrically-conductive material such as a plastic, a fiber reinforced plastic, a ceramic, or a composite material thereof (see FIGS. 11A, 11B, and 12). Both ends of this power supply coil 204 are connected to output terminals of the power supply circuit 203. High-frequency power is supplied from the power supply circuit 203 to generate a magnetic field and thus the power supply coil 204 wirelessly supplies power to the vehicle M.

The bag 205 is a type of balloon in which a stretchable elastic member such as rubber is formed in a film shape, and is installed on the ground surface G. In addition, the bag 205 is installed so that one end surface (lower surface) of the power supply coil 204 is in contact with an upper side 205*a* (see FIGS. 11A, 11A, and 12), thereby supporting the power supply coil 204. When this bag 205 is closed and the gas (for example, air) is supplied from the gas supply and exhaust mechanism 207, the bag 205 expands to lift the power supply coil 204 and the power supply coil 204 is moved to the power receiving coil 211 of the vehicle M to be described below.

The spacer 206 is a plate-like member having a specific hardness which does not degrade the efficiency of wireless power supply of a non-magnetic property and a non-electrically-conductive property, for example, such as a plastic, and is disposed on the other end surface (upper surface) of the power supply coil 204 and supported by the power supply coil 204 (see FIGS. 11A, 11B, and 12). Here, the specific hardness means a hardness at which the spacer 206 is not substantially deformed when the bag 205 expands to press the spacer 206 on the power receiving coil 211. The spacer 206 is formed of a thickness equivalent to a distance at which transmission efficiency of wireless power supply between the power supply coil 204 and the power receiving coil 211 of the vehicle M is optimized.

In addition, an upper surface 206*a* of the spacer 206 is evenly formed so that a posture is stable when the spacer 206 abuts the power receiving coil 211 and the spacer 206 does not interfere with the vehicle M when the vehicle M passes through the upper surface 206*a*.

The gas supply and exhaust mechanism 207 is a type of pump configured to supply a gas inside the bag 205 and exhaust the gas from the bag 205 based on a control command input from the power supply control unit 208. In the gas supply and exhaust mechanism 207, a pressure gauge is provided in a supply port of the pump which supplies the gas to the bag 205 and a detection result (detection signal) by the pressure gauge is output to the power supply control unit 208. In addition, the gas supply and exhaust mechanism 207 has a valve that opens and closes according to a command from the power supply control unit 208, for example, a valve that opens and closes according to an electric signal to exhaust the gas.

The power supply control unit 208 includes a microprocessor, a memory, or the like, is a software type control apparatus that functions based on a power supply control program, and controls the power supply circuit 203 and the gas supply and exhaust mechanism 207. Details of a process of this power supply control unit 208 will be described below.

The vehicle M is a vehicle that is driven by a driver and runs on a road. For example, the vehicle M is an EV or an HV using a battery as a power source. As shown in FIG. 10, the vehicle M includes a power receiving coil 211, a power receiving circuit 212, a charging circuit 213, a battery 214, and a power reception control unit 215. Also, although not shown in FIG. 10, of course, the vehicle M includes components necessary for running such as a traction motor, an operation handle, and a brake, as well as an engine in the case of a hybrid vehicle.

The power receiving coil 211 is a circular type coil or a solenoid type coil, faces the power supply coil 204, and is installed on the bottom of the vehicle M in a posture in which a coil axis is in a vertical direction in the case of the circular type coil so that highly efficient wireless power supply is enabled with the power supply coil 204, and a posture in which the coil axis is horizontal and in parallel to the coil axis of the power supply coil 204 in the case of the solenoid type coil. Both ends of the power receiving coil 211 are connected to the input terminals of the power receiving circuit 212, an electromotive force is generated through electromagnetic induction when a magnetic field of the power supply coil 204 acts, and the electromotive force is output to the power receiving circuit 212. Although all the power supply coil 204 and the power receiving coil 211 are of the same type, that is, circular type coils or solenoid type coils, sizes and shapes of the power supply coil 204 and the power receiving coil 211 may be the same or different as long as highly efficient wireless power supply is possible.

Input terminals of the power receiving circuit 212 are connected to both ends of the power receiving coil 211, and output terminals thereof are connected to input terminals of the charging circuit 213. The power receiving circuit 212 includes a resonance capacitor constituting the power receiving side resonance circuit along with the power receiving coil 211, and is a type of rectifying circuit configured to convert AC power supplied from the power receiving coil 211 into DC power to supply the DC power to the charging circuit 213. Also, the electrostatic capacitance of the resonance capacitor of the power receiving circuit 212 is set at the same frequency, or substantially the same frequency, as the resonance frequency of the power supply side resonance circuit and the resonance frequency of the power receiving side resonance circuit described above so that highly efficient wireless power supply is possible.

The charging circuit 213 is a type of DC-DC converter configured to charge the battery 214 by converting power (DC power) supplied from the power receiving circuit 212 into a voltage suitable for charging of the battery 214, input terminals of the charging circuit 213 are connected to output terminals of the power receiving circuit 212, and output terminals thereof are connected to input terminals of the battery 214. The battery 214 is a rechargeable battery (for example, a secondary battery such as a lithium ion battery or a nickel-metal hydride battery) mounted in the vehicle M, and supplies driving power to a fraction motor (not shown) or the like. The power reception control unit 215 includes a microprocessor, a memory, and the like, is a software type control apparatus which functions based on the power reception control program, and controls the charging circuit 213.

Next, an operation of this wireless power supply system configured as described above will be described.

First, an operation of the vehicle M and the ground power supply apparatus S under no power supply will be described. The power reception control unit 215 of the vehicle M stops the charging circuit 213 when no power is supplied (for example, when the driver performs normal driving of the vehicle M). The power supply control unit 208 of the ground power supply apparatus S stops the power supply circuit 203 when no power is supplied, that is, when the vehicle M which is a power supply target is not stopped at a parking/stopping position, and causes the gas supply and exhaust mechanism 207 to exhaust the gas within the bag 205 so that the bag 205 completely contracts. This can be realized by opening the opening/closing valve for gas exhaust.

Thereafter, the driver drives the vehicle M to move the vehicle M to an installation place of the ground power supply apparatus S and stops the vehicle M in that place. The power reception control unit 215 of the vehicle M recognizes an installation position of the ground power supply apparatus S from an output of a position sensor such as a sound wave sensor or an optical sensor (not shown). The power reception control unit 215 causes the charging circuit 213 to start a charging operation when the movement to above the ground power supply apparatus S is detected from the output of the position sensor such as the sound wave sensor or the optical sensor as described above. However, because no wireless power supply starts and the output from the power receiving circuit 212 is zero, the output of the charging circuit 213 is also zero and no power is supplied to the battery 214.

The power supply control unit 208 of the ground power supply apparatus S recognizes the position of the vehicle M from an output of a position sensor such as a sound wave sensor or an optical sensor (not shown) as in the vehicle M. When it is detected that the vehicle M has moved above the ground power supply apparatus S from the output of the position sensor such as the sound wave sensor or the optical sensor (not shown), the power supply control unit 208 causes the gas supply and exhaust mechanism 207 to supply the gas so that the bag 205 expands. Also, the opening/closing valve for exhausting the gas is closed.

Here, the power supply control unit 208 controls the gas supply and exhaust mechanism 207 based on a detection signal input from a pressure gauge of the gas supply and exhaust mechanism 207. That is, until the detection result by the pressure gauge reaches a specific pressure, the power supply control unit 208 causes the gas supply and exhaust mechanism 207 to supply the gas. Thereby, the power supply coil 204 is lifted through the expanded bag 205 and moves toward the power receiving coil 211.

Then, the power supply control unit 208 stops the supply of the gas when a specific pressure is reached. Here, the specific pressure is a pressure determined based on an elastic modulus of a material of the bag 205, and the specific pressure is set a pressure such that, if the gas is continuously supplied, an elastic limit of the bag 205 is exceeded and the bag 205 is damaged without deformation of the bag 205. As a result, as shown in FIG. 12, the upper surface 206*a* of the spacer 206 abuts the power receiving coil 211 of the vehicle M and the power supply coil 204 and the power receiving coil 211 are disposed to face each other across the spacer 206. That is, the power supply coil 204 and the power receiving coil 211 are spaced at a distance at which transmission efficiency is optimized in a magnetic field resonance scheme and disposed to face each other.

Subsequently, the power supply control unit 208 causes the power supply circuit 203 to start the power supply operation. Here, because the power supply coil 204 and the power receiving coil 211 are spaced at the distance at which the transmission efficiency is optimized in the magnetic field resonance scheme and disposed to face each other, power is supplied from the power supply coil 204 to the power receiving coil 211 at high transmission efficiency. As a result, the power is output from the power receiving circuit 212, the charging circuit 213 starts the power supply to the battery 214, and the battery starts to be charged.

The power reception control unit 215 of the vehicle M causes the charging circuit 213 to appropriately charge the battery 214 while monitoring the charged state of the battery 214. When it is detected that the battery 214 is fully charged, the power reception control unit 215 notifies that the battery 214 is fully charged through the indicator (not shown) or the like. Then, the power supply control unit 208 of the ground power supply apparatus S stops control of the power supply circuit 203 and causes the gas supply and exhaust mechanism 207 to completely contract the bag 205. For example, the bag 205 is degassed to completely contract by stopping the pump and opening the opening/closing valve for gas exhaust. When the driver recognizes the full charge and that the bag 205 has completely contracted through an indicator (not shown) or the like, he/she drives the vehicle M to move the vehicle M from an installation place of the ground power supply apparatus S.

When the driver has driven the vehicle M to move the vehicle M from an installation place of the ground power supply apparatus S in a state in which the bag 205 has expanded, the power supply control unit 208 of the ground power supply apparatus S stops the control of the power supply circuit 203 if it is detected that the vehicle M has moved from the output of the position sensor such as the sound wave sensor or the optical sensor (not shown), causes the gas supply and exhaust mechanism 207 to completely contract the bag 205, and prevents the spacer 206 and the power receiving coil 211 from abutting each other. For example, the bag 205 is degassed to completely contract by stopping the pump and opening the opening/closing valve for gas exhaust. Thereby, electrical damage to the power supply circuit 203 and the power receiving circuit 212 and mechanical damage to the bag 205, the power supply coil 204, and the power receiving coil 211 are prevented.

According to this embodiment, it is possible to wirelessly supply power in a state in which the power supply coil 204 and the power receiving coil 211 are spaced at a distance at which transmission efficiency is optimized via the spacer 206 by expanding the bag 205 and disposed to face each other. Moreover, even when the vehicle M has a suspension and moves vertically during charging, an excessive force is prevented from being applied to the spacer 206, the power supply coil 204, and the power receiving coil 211 and mechanical damage is prevented because the gas within the bag 205 is also elastic and the deformation of the elastic bag 205 is allowed. In addition, according to this embodiment, the reduction of cost and the simplification of a configuration of the vehicle M are possible without providing a vehicle height adjustment mechanism and a possibility of contamination and damage to a height sensor through foreign objects such as dirty mud or stones is eliminated because no height sensor is provided.

Seventh Embodiment

Next, a wireless power supply system according to the seventh embodiment will be described.

Figure 13A:
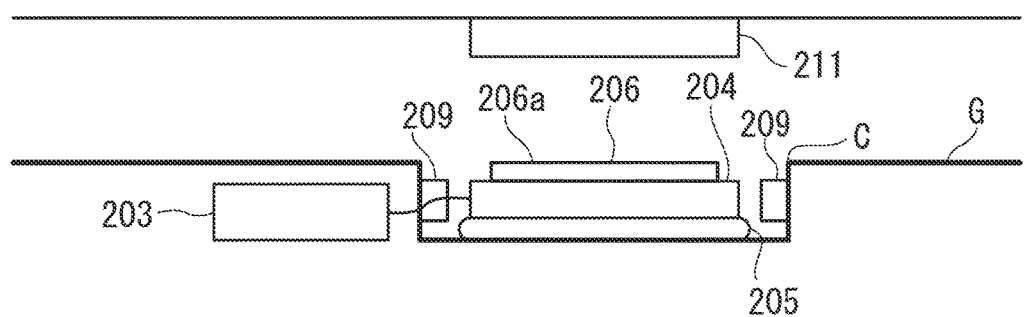
FIG. 13A is a side view of a first bag, a spacer, and a movement restricting member in a wireless power supply system according to a seventh embodiment of the present disclosure.
Figure 13B:
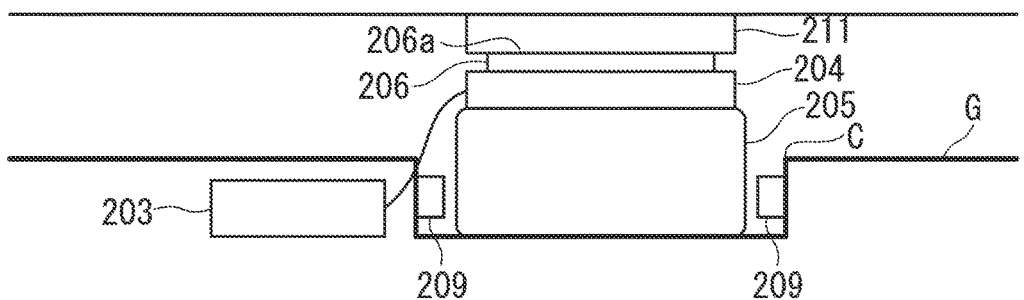
FIG. 13B is a side view showing a state in which the first bag has expanded in the wireless power supply system according to the seventh embodiment of the present disclosure.

The wireless power supply system according to this seventh embodiment is different from the above-described sixth embodiment in that a power supply circuit 203 is embedded in a ground surface G, a bag 205 is installed within a concave portion C provided in the ground surface G rather than on the ground surface G of a parking/stopping position (a place in which the vehicle M may stop), that is, the power supply coil 204, the bag 205, and the spacer 206 are held in the concave portion C, and a movement restricting member 209 is newly provided in the concave portion C as shown in FIGS. 13A and 13B. The other components are similar to those of the sixth embodiment. Therefore, description of similar components to the sixth embodiment will be omitted in the seventh embodiment.

As in the sixth embodiment, this power supply circuit 203 is a type of inverter configured to convert the DC power supplied from the rectifying circuit 202 into AC power (high-frequency power) to supply the high-frequency power to the power supply coil 204 based on a control command input from the power supply control unit 208, and is connected to the power supply coil 204 through a flexible electric cable. In addition, the power supply circuit 203 is different from that of the sixth embodiment and is embedded in a ground surface G in the vicinity of the concave portion C.

As in the sixth embodiment, the power supply coil 204 is a circular type coil or a solenoid type coil configured to wirelessly supply power to the vehicle M when high-frequency power is supplied from the power supply circuit 203 to generate a magnetic field. In addition, the power supply coil 204 is different from that of the sixth embodiment and is held in the concave portion C when the bag 205 contracts.

As in the sixth embodiment, the power supply coil 204 is disposed so that one end surface (lower surface) of the power supply coil 204 is in contact with an upper side 205a the bag 205 supports the power supply coil 204. Then, when the gas is supplied from the gas supply and exhaust mechanism 207, the bag 205 expands to lift the power supply coil 204 and moves the power supply coil 204 toward the power receiving coil 211. In addition, the bag 205 is different from that of the sixth embodiment, and is installed on the bottom of the concave portion C instead of the ground surface G.

As in the sixth embodiment, the spacer 206 is disposed on the other end (upper surface) of the power supply coil 204 and formed of a thickness equivalent to a distance at which transmission efficiency of the power supply coil 204 and the power receiving coil 211 of the vehicle M is optimized. In addition, the spacer 206 is different from that of the sixth embodiment and is held in the concave portion C when the bag 205 contracts.

The movement restricting member 209 is installed on an inner surface of the concave portion C facing a peripheral surface of the power supply coil 204 and restricts the movement of the power supply coil 204 held within the concave portion C in the horizontal direction. When the wheel of the vehicle M passes through the concave portion C, the wheel abuts the spacer 206 and the power supply coil 204 is dragged by the vehicle M to move within the concave portion C. The movement restricting member 209 restricts the movement in which the power supply coil 204 is dragged by the vehicle M as described above. This movement restricting member 209, for example, includes an elastic member such as rubber or a sponge.

Next, an operation of this seventh embodiment configured as described above will be described. Also, description of a similar operation to the sixth embodiment will be omitted.

When it is detected that the vehicle M has moved above the ground power supply apparatus S from an output of a position sensor such as a sound wave sensor or an optical sensor (not shown), the power supply control unit 208 of the ground power supply apparatus S causes the gas supply and exhaust mechanism 207 to supply the gas so that the bag 205 completely expands.

Here, the power supply control unit 208 controls the gas supply and exhaust mechanism 207 based on a detection signal input from a pressure gauge of the gas supply and exhaust mechanism 207. That is, until the detection result by the pressure gauge reaches a specific pressure, the power supply control unit 208 causes the gas supply and exhaust mechanism 207 to supply the gas. Thereby, the power supply coil 204 is lifted through the expanded bag 205 and moves toward the power receiving coil 211.

Then, the power supply control unit 208 stops the supply of the gas when a specific pressure is reached. As a result, as shown in FIG. 13B, the upper surface 206a of the spacer 206 abuts the power receiving coil 211 of the vehicle M and the power supply coil 204 and the power receiving coil 211 are disposed to face each other across the spacer 206. That is, the power supply coil 204 and the power receiving coil 211 are spaced at a distance at which transmission efficiency is optimized in a magnetic field resonance scheme and disposed to face each other.

Subsequently, the power supply control unit 208 causes the power supply circuit 203 to start the power supply operation. Here, because the power supply coil 204 and the power receiving coil 211 are spaced at the distance at which the transmission efficiency is optimized in the magnetic field resonance scheme and disposed to face each other, power is supplied from the power supply coil 204 to the power receiving coil 211 at high transmission efficiency.

The power reception control unit 215 of the vehicle M controls the charging circuit 213 to appropriately charge the battery 214 while monitoring the charged state of the battery 214. When it is detected that the battery 214 is fully charged, the power reception control unit 215 notifies that the battery 214 is fully charged through the indicator (not shown) or the like. Then, when the driver recognizes the full charge through an indicator (not shown) or the like, he/she drives the vehicle M to move the vehicle M from an installation place of the ground power supply apparatus S.

Here, because the power supply circuit 203 is embedded in the ground surface G and the power supply coil 204, the bag 205, and the spacer 206 are held in the concave portion C, it is possible to prevent the wheel or the like of the vehicle M from colliding with the power supply circuit 203, the power supply coil 204, the bag 205, and the spacer 206. In addition, even when the wheel of the vehicle M has passed over the concave portion C, it is possible to prevent the power supply coil 204 from being dragged by the vehicle M because the movement of the power supply coil 204 in the horizontal direction is restricted by the movement restricting member 209.

According to this embodiment, the power supply coil 204 and the power receiving coil 211 can be spaced at a distance at which transmission efficiency is optimized via the spacer 206 by expanding the bag 205 and the power supply coil 204 and the power receiving coil 211 can be disposed to face each other. In addition, according to this embodiment, the reduction of cost and the simplification of a configuration of the vehicle are possible without providing a vehicle height adjustment mechanism and a possibility of contamination and damage to a height sensor through a foreign object such as dirty mud or stone is eliminated because no height sensor is provided.

In addition, according to this embodiment, because the power supply circuit 203 is embedded in the ground surface G and the power supply coil 204, the bag 205, and the spacer 206 are held in the concave portion C and it is possible to prevent the wheel or the like of the vehicle M from colliding with the power supply circuit 203, the power supply coil 204, the bag 205, and the spacer 206, they do not interfere with the running of the vehicle M. In addition, according to this embodiment, even when the wheel of the vehicle M has passed over the concave portion C, it is possible to prevent the power supply coil 204 from being dragged by the vehicle M because the movement of the power supply coil 204 in the horizontal direction is restricted by the movement restricting member 209.

Also, the present disclosure is not limited to the above-described embodiment, and, for example, the following modifications are possible.

(1) In the above-described sixth and seventh embodiments, the spacer 206 may be detachable. For example, when there are a plurality of standards in which distances at which transmission efficiencies of the power supply coil 204 and the power receiving coil 211 are high are different (for example, when a size or shape of the power receiving coil 211 differs according to standards) in the wireless power supply of the magnetic field resonance scheme, a change to a spacer 206 having a thickness differing according to a standard may be made.

(2) Although the present disclosure is applied to a wireless power supply system having the ground power supply apparatus S provided in a posture in which the coil axis is in the vertical direction when the power supply coil 204 is a circular type coil and a posture in which the coil axis is in the horizontal direction when the power supply coil 204 is a solenoid type coil in the above-described sixth and seventh embodiments, the present disclosure is not limited thereto. For example, the present disclosure may be applied to a wireless power supply system having the ground power supply apparatus S provided in a posture (horizontal posture) in which the coil axis is in the horizontal direction or a posture in which the coil axis is tilted when the power supply coil 204 is the circular type coil. That is, the spacer 206 may be installed on one end surface of the power supply coil 204 of the horizontal posture or the tilted posture and the bag 205 may be installed between a wall for attaching the power supply coil 204 and the other end surface of the power supply coil 204.

(3) Although the spacer 206 has a plate-like member in the above-described sixth and seventh embodiments, the present disclosure is not limited thereto. For example, the spacer 206 may be a rod-like member having the same height as a distance at which transmission efficiencies of the power supply coil 204 and the power receiving coil 211 of the vehicle M are optimized. In addition, although the spacer 206 abuts the power receiving coil 211 when the bag 205 has expanded in the above-described sixth and seventh embodiments, the spacer 206 may abut a base of the vehicle M. For example, the rod-like spacer 206 is installed in a vertical posture on a peripheral surface of the power supply coil 204 and the power supply coil 204 and the power receiving coil 211 may be spaced at a distance at which transmission efficiency is optimized and disposed to face each other when the spacer 206 abuts the base of the vehicle M.

(4) In the above-described sixth and seventh embodiments, the power supply apparatus is the ground power supply apparatus S embedded in the ground surface and the power receiving apparatus is the vehicle M which runs on the ground surface. The present disclosure is not limited thereto. For example, the power supply apparatus may be an underwater power supply apparatus installed underwater and the power receiving apparatus may be an autonomous underwater vehicle which moves underwater. In addition, the above-described autonomous underwater vehicle should externally extract water quality data when underwater water quality or the like is investigated. In this case, a communication antenna may be provided inside the bag 205 provided in the underwater power supply apparatus and water quality data may be externally extracted via the communication antenna.

That is, the underwater power supply apparatus is connected to a water quality data management apparatus or the like on the ground via a communication cable, the autonomous underwater vehicle wirelessly transmits the water quality data to the underwater power supply apparatus via the communication antenna when the autonomous underwater vehicle transmits power (when the battery 214 is charged), and the underwater power supply apparatus may perform wired transmission on water quality data received from the autonomous underwater vehicle via the communication antenna to the water quality data management apparatus or the like. In addition, a fluid to be supplied inside the bag 205 may be a liquid instead of a gas. In particular, in the case of a magnetic field resonance scheme, the liquid may be a certain liquid (for example, saltwater) having an ion property as long as the liquid has a property that it does not damage the bag 205, and may be distilled water, an alcohol, or the like. In particular, because specific gravities of the gas and the liquid are different, it is possible to adjust a balance of the weight of the power supply apparatus using the gas and the liquid together.

It is possible to further improve transmission efficiency between the power supply coil and the power receiving coil in a wireless power supply system by applying the technologies described in the following eighth and ninth embodiments in addition to technology described in the above-described embodiments and enabling much power to be transmitted in a short time.

Eighth Embodiment

Figure 14:
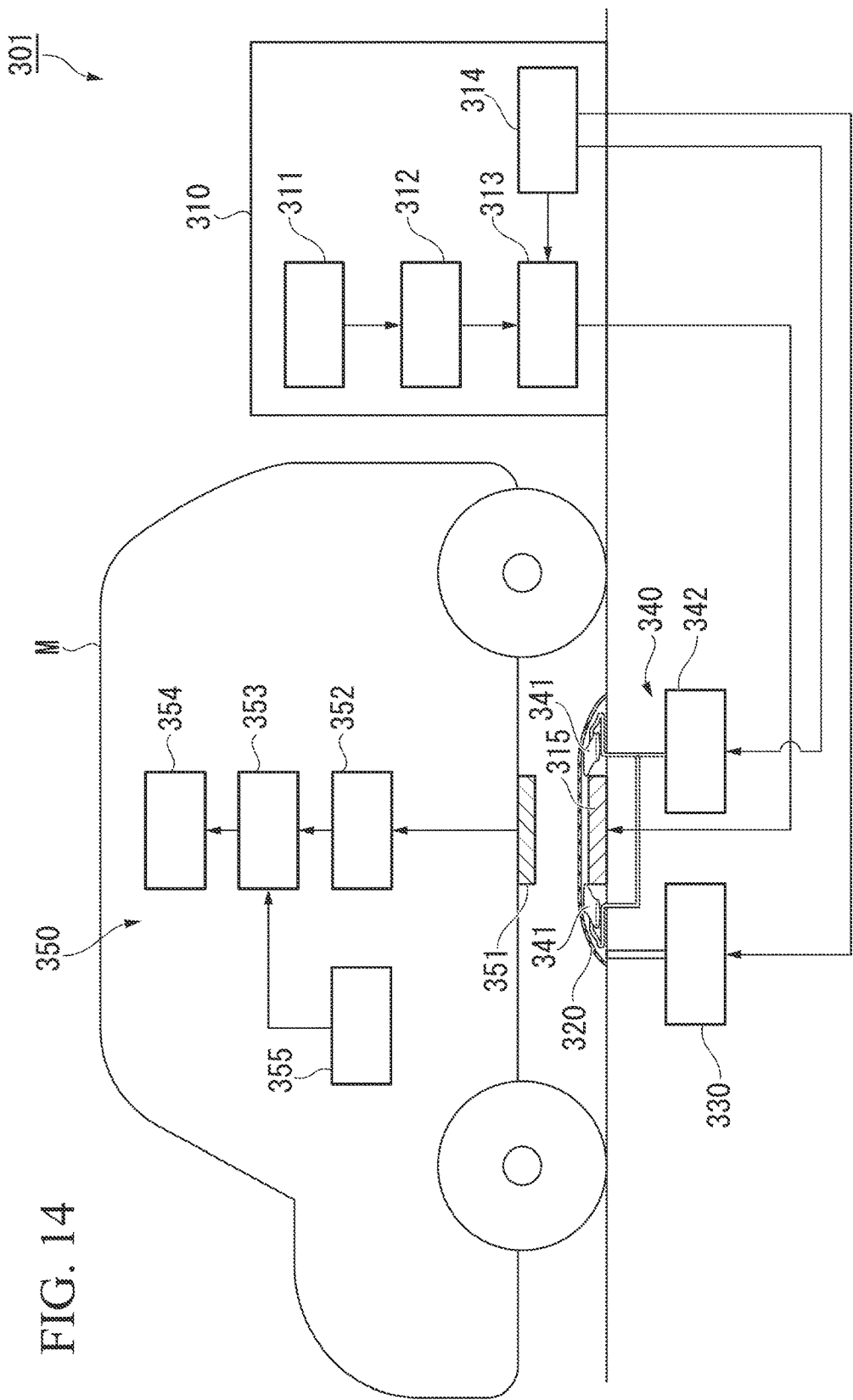
FIG. 14 is a block diagram showing a configuration of main parts of a wireless power supply system according to an eighth embodiment of the present disclosure.

FIG. 14 is a block diagram showing a main part configuration of a wireless power supply system 301 according to the eighth embodiment of the present disclosure. As shown in FIG. 14, the wireless power supply system 301 includes a power supply apparatus 310 installed in a ground surface side, a balloon 320 corresponding to the second bag in the first to fifth embodiments, a gas supply and exhaust apparatus 330 for power supply, a magnetic material unit 340, and a power receiving apparatus 350 mounted on the side of a vehicle M (movable object), and wirelessly supplies power from the power supply apparatus 310 to the power receiving apparatus 350.

The power supply apparatus 310 includes a power source 311, a rectifying circuit 312, a power supply circuit 313, a power supply control unit 314, and a power supply coil 315, generates power suitable for wireless power supply to the power receiving apparatus 350, and performs various types of control necessary in performing wireless power supply to the power receiving apparatus 350. Also, although an example in which the power supply apparatus 310 is installed on the ground has been described in this embodiment, the power supply apparatus 310 may be installed under the ground or in an upper portion (for example, a ceiling) of the vehicle M.

Output terminals of the power source 311 are connected to input terminals of the rectifying circuit 312, and the power source 311 supplies the rectifying circuit 312 with AC power necessary for power supply to the power receiving apparatus 350. This power source 311, for example, is system power source for supplying three-phase AC power of 200 V, 400 V, or the like or single-phase AC power of 100 V.

Input terminals of the rectifying circuit 312 are connected to the power source 311 and output terminals thereof are connected to the power supply circuit 313. The rectifying circuit 312 rectifies AC power supplied from the power source 311 to convert the rectified AC power into DC power and outputs the DC power obtained through the conversion to the power supply circuit 313.

Input terminals of the power supply circuit 313 are connected to the rectifying circuit 312 and output terminals thereof are connected to both ends of the power supply coil 315. The power supply circuit 313 converts the DC power from the rectifying circuit 312 into AC power and outputs the AC power obtained through the conversion to the power supply coil 315. Specifically, the power supply circuit 313 includes a resonance capacitor constituting a power supply side resonance circuit along with the power supply coil 315, converts the DC power from the rectifying circuit 312 into AC power (high-frequency power) having a higher frequency than the AC power of the power source 311 to output the high frequency power to the power supply coil 315 under control of the power supply control unit 314.

The power supply control unit 314 causes the power supply circuit 313 to generate power to be supplied to the power receiving apparatus 350. This power supply control unit 314 includes a CPU, a memory, or the like, and performs various types of control based on a prepared control program. In addition, the power supply control unit 314 causes the gas supply and exhaust apparatus 330 for power supply to expand or contract the balloon 320. Further, the power supply control unit 314 also controls the magnetic material unit 340.

The power supply coil 315 includes a helical coil having prescribed coil shape dimensions. Also, the power supply coil 315 may be provided to be integrated with a cover formed of a non-magnetic material such as a plastic for molding of the power supply coil 315. This power supply coil 315 wirelessly supplies power to the power receiving apparatus 350 by generating a magnetic field according to high-frequency power supplied from the power supply circuit 313. Also, the power supply coil 315 in this embodiment becomes a so-called solenoid type coil of which a winding axis direction is a horizontal direction.

The balloon 320 is fixed to a ground surface side to cover the power supply coil 315, expanded (swollen) by internally supplying the gas from the gas supply and exhaust apparatus 330 for power supply, and contracted (shrunken) by suctioning the supplied gas to the gas supply and exhaust apparatus 330 for power supply in the same way.

This balloon 320, for example, is formed of a rubber material or the like having elasticity. Also, the balloon 320 may be formed using rubber obtained by combining aluminum powder or copper powder except for a magnetic path connecting the power supply coil 315 and the power receiving coil 351. Thereby, it is possible to reduce a leaked magnetic field.

The gas supply and exhaust apparatus 330 for the power supply performs the supply and exhaust of the gas for the balloon 320 under control of the power supply control unit 314. As shown in FIG. 14, this gas supply and exhaust apparatus 330 for power supply is connected to the balloon 320 via the gas supply and exhaust pipe and performs the supply and exhaust of the gas to and from the balloon 320 via the power supply and exhaust pipe.

Figure 15A:
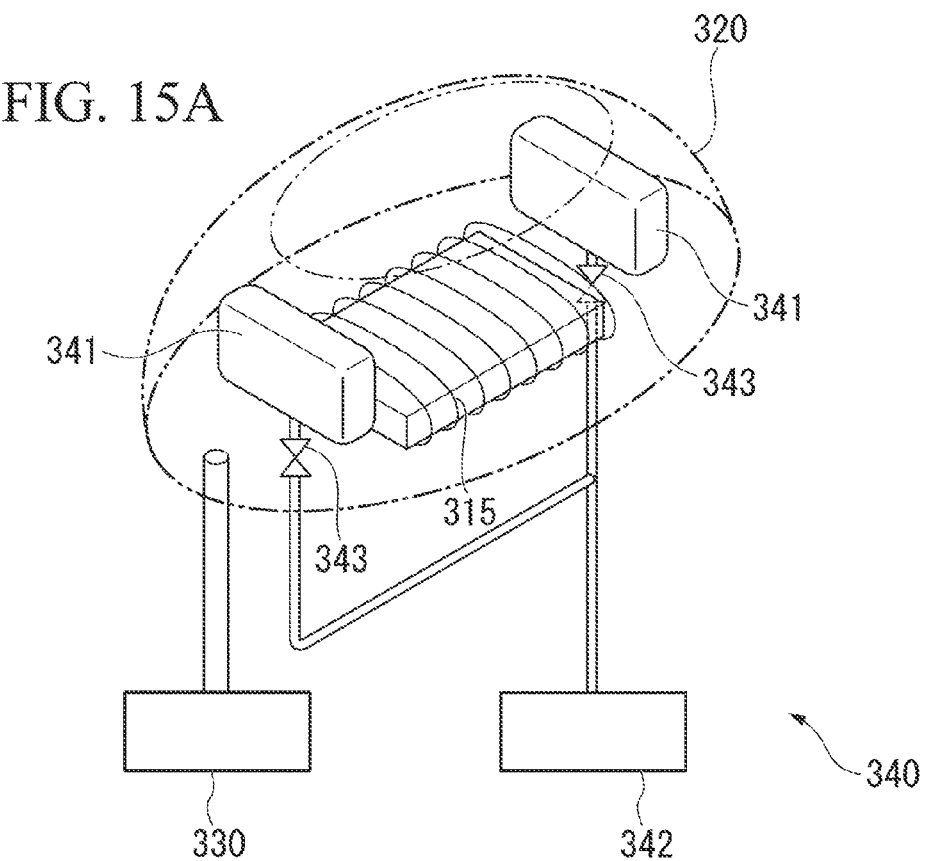
FIG. 15A is a perspective view representing an enlarged schematic diagram including a magnetic material unit provided in the wireless power supply system according to the eighth embodiment of the present disclosure.
Figure 15B:
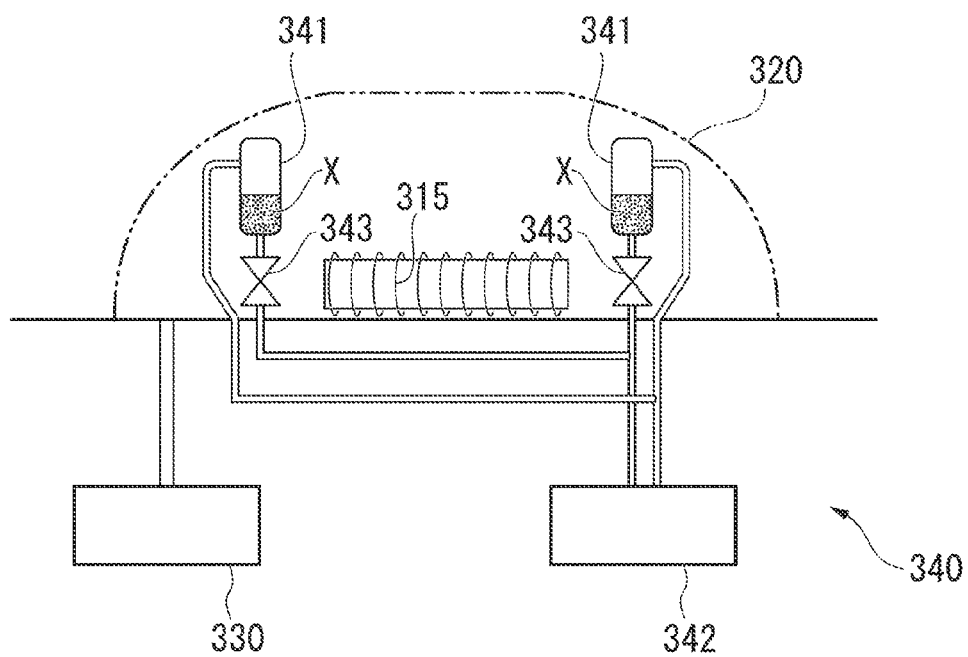
FIG. 15B is a side view representing the enlarged schematic diagram including the magnetic material unit provided in the wireless power supply system according to the eighth embodiment of the present disclosure.

FIGS. 15A and 15B are enlarged schematic views including a magnetic material unit 340, FIG. 15A is a perspective view, and FIG. 15B is a side view. The magnetic material unit 340 is installed on a ground surface side and has magnetic material storage units 341 (magnetic material storage bags), a magnetic material supply apparatus 342, and a retrieving valve 343 (retrieving means) as shown in FIGS. 15A and 15B.

The magnetic material storage unit 341 is a member which expands or contracts as in the balloon 320 when the gas supply/exhaust from the magnetic material supply apparatus 342 is performed and is connected to the magnetic material supply apparatus 342. The magnetic material storage units 341 are provided to be disposed in a magnetic path formed between the power supply coil 315 and the power receiving coil 351 on both sides of the power supply coil 315 during expansion. In addition, during contraction, the magnetic material storage units 341 are disposed so that they do not interfere with the contraction of the balloon 320 as shown in FIG. 14. During expansion, the magnetic material storage units 341 can store powder-like magnetic materials X supplied from the magnetic material supply apparatus 342. Also, a gas exhaust path having a filter (not shown) is connected to the magnetic material storage unit 341 and the magnetic material storage unit 341 is configured to be supplied with the magnetic material X even in the case of expansion.

The magnetic material supply apparatus 342 is connected to the magnetic material storage unit 341 and supplies the powder-like magnetic material X and the gas to the magnetic material storage unit 341 under control of the power supply control unit 314. Thereby, the magnetic material storage unit 341 expands and the magnetic material X is supplied to the magnetic material storage unit 341. In addition, under control of the power supply control unit 314, the magnetic material storage unit 341 adjusts an amount of the magnetic material X to be supplied to the magnetic material storage unit 341. Further, the magnetic material storage unit 341 is contracted by suctioning the gas supplied to the magnetic material storage unit 341.

The retrieving valve 343 is installed below each magnetic material storage unit 341 and is open, so that the magnetic material X stored in the magnetic material storage unit 341 drops into the magnetic material supply apparatus 342 and is retrieved.

Figure 16:
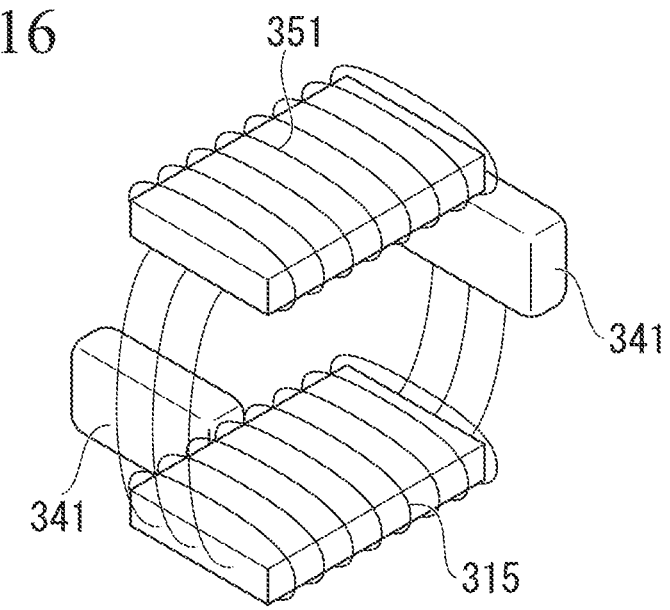
FIG. 16 is a schematic diagram showing a magnetic path formed between a power supply coil and a power receiving coil of the wireless power supply system according to the eighth embodiment of the present disclosure.

When the magnetic path is formed between the power supply coil 315 and the power receiving coil 351 in a state in which the magnetic material X has been stored in the magnetic material storage unit 341 in the magnetic material unit 340, the magnetic material storage unit 341 is disposed in the magnetic path as shown in FIG. 16. Thereby, the magnetic material X stored in the magnetic material storage unit 341 is magnetized and creates a region having higher permeability than air. As a result, magnetic resistance between the power supply coil 315 and the power receiving coil 351 decreases.

The vehicle M is a vehicle that is driven by a driver and runs on a road. For example, the vehicle M is an EV or an HV including a traction motor as a power generation source. As shown in FIG. 14, the vehicle M includes a power receiving apparatus 350. Although not shown in FIG. 14, the vehicle M includes components necessary for running such as an engine, the aforementioned traction motor, an operation handle, and a brake.

The power receiving apparatus 350 includes a power receiving coil 351, a power receiving circuit 352, a charging circuit 353, a battery 354, and a power reception control unit 355. The power receiving coil 351 includes a helical coil having substantially the same coil diameter as the above-described power supply coil 315. Also, the power receiving coil 351 may be provided to be integrated with a cover formed of a non-magnetic material such as a plastic for molding the power receiving coil 351. The power receiving coil 351 is provided on the bottom of the vehicle M in a posture in which the coil axis is in the vertical direction so that the power receiving coil 351 can face the power supply coil 315. Both ends of the power receiving coil 351 are connected to input terminals of the power receiving circuit 352, and the power receiving coil 351 generates an electromotive force when a magnetic field of the power supply coil 315 acts, and outputs the generated electromotive force to the power receiving circuit 352. Also, the power receiving coil 351 in this embodiment becomes a so-called solenoid type coil of which a winding axis direction is a horizontal direction.

Input terminals of the power receiving circuit 352 are connected to both ends of the power receiving coil 351, and output terminals thereof are connected to input terminals of the charging circuit 353. The power receiving circuit 352 converts AC power supplied from the power receiving coil 351 into DC power to output the DC power obtained through the conversion to the charging circuit 353. This power receiving circuit 352 includes a resonance capacitor constituting a resonance circuit of a power receiving side along with the power receiving coil 351. Further, the electrostatic capacitance of the resonance capacitor of the power receiving circuit 352 is set so that a resonance frequency of the resonance circuit of the power receiving side is the same as a resonance frequency of the resonance circuit of the power supply side described above.

Input terminals of the charging circuit 353 are connected to output terminals of the power receiving circuit 352 and output terminals thereof are connected to input terminals of the battery 354. The charging circuit 353 charges the battery 354 with power (DC power) from the power receiving circuit 352. The battery 354 is a rechargeable battery (for example, a secondary battery such as a lithium ion battery or a nickel-metal hydride battery) mounted in the vehicle M, and supplies power to a traction motor (not shown) or the like. The power reception control unit 355 includes a CPU, a memory, and the like, and controls the charging circuit 353 based on a prepared power reception control program.

When no power is supplied (for example, when the vehicle M is driven by the driver normally), the control of stopping the charging circuit 353 is performed by the power reception control unit 355 in the wireless power supply system 301 of this embodiment. In addition, when no power is supplied (that is, when the vehicle M which is a power supply target is not parked/stopped at a parking/stopping position), the power supply control unit 314 causes the power supply circuit 313 to stop in the power supply apparatus 310.

Thereafter, when the driver drives the vehicle M to move the vehicle M to a place in which the power supply coil 315 is installed and stops the vehicle M in that place, an installation position of the power supply coil 315 is recognized by the power reception control unit 355. As a method of recognizing the installation position of the power supply coil 315, for example, there is a method of recognizing the installation position from an output of a position sensor such as a sound wave sensor or an optical sensor (not shown).

Even in the power supply control unit 314 of the power supply apparatus 310, as in the vehicle M, the position of the vehicle M is recognized by the power supply control unit 314 from an output of a position sensor such as a sound wave sensor or an optical sensor (not shown). When it is detected that the power receiving coil 351 is disposed above the power supply coil 315, the power supply control unit 314 causes the gas to be supplied from the gas supply and exhaust apparatus 330 for power supply to the balloon 320. Thereby, the balloon 320 expands. Further, the power supply control unit 314 causes the gas and the magnetic material X to be supplied from the magnetic material supply apparatus 342 to the magnetic material storage unit 341. Thereby, the magnetic material storage unit 341 expands and the magnetic material X including a powder is stored in the magnetic material storage unit 341.

When the above operation ends, the power supply circuit 313 of the power supply apparatus 310 is controlled by the power supply control unit 314, so that a power supply operation is started. Thereby, power is wirelessly supplied from the power supply coil 315 to the power receiving coil 351 installed in the vehicle M. When the power is wirelessly supplied, the power reception control unit 355 causes the charging circuit 353 to charge the battery 354 while monitoring a charged state of the battery 354 in the power receiving apparatus 350.

When it is detected that the battery 354 is fully charged, the power reception control unit 355 performs control of stopping the charging circuit 353 and notifies an indicator (not shown) or the like (for example, an indicator indicating the full charge of the battery 354 provided in a driver seat) of the fact that the battery 354 is fully charged. Through this notification, the driver can recognize that the battery 354 is fully charged.

The power supply control unit 314 of the power supply apparatus 310 determines whether power supply has ended while the wirelessly power supply is performed. Here, a determination of whether the power supply has ended, for example, can be performed based on whether an amount of power supply to the vehicle M has rapidly decreased. When it is determined that the power supply has not ended, the power supply control unit 314 causes the power supply circuit 313 to continue the wireless power supply. On the other hand, when it is determined that the power supply has ended, the power supply control unit 314 causes the power supply circuit 313 to stop the power supply operation.

When the power supply operation stops, the power supply control unit 314 retrieves the magnetic material X by opening the retrieving valve 343 and contracts the magnetic material storage unit 341 by exhausting the gas supplied inside the magnetic material storage unit 341 to the magnetic material supply apparatus 342. In addition, the power supply control unit 314 causes the gas supply and exhaust apparatus 330 for power supply to exhaust the gas supplied inside the balloon 320 and contract the balloon 320. Thereby, the driver can drive the vehicle M to move from an installation place of the power supply coil 315.

The wireless power supply system 301 of this embodiment includes a magnetic material X disposed in a magnetic path formed between the power supply coil 315 and the power receiving coil 351. This magnetic material X is installed in a magnetic path and magnetized and creates a region having higher permeability than air. Through this region, magnetic resistance between the power supply coil 315 and the power receiving coil 351 is decreased. Therefore, according to the wireless power supply system 301 of this embodiment, much power can be transmitted by appropriately adjusting impedance of a system in a wireless power supply system even when a distance between the power supply coil 315 and the power receiving coil 351 is long.

In addition, the wireless power supply system 301 of this embodiment includes a magnetic material storage unit 341 in which the magnetic material X includes a powder and which is disposed in the magnetic path when the balloon 320 has expanded and can store the magnetic material X and a magnetic material supply apparatus 342 configured to supply the magnetic material X to the magnetic material storage unit 341. Thus, it is possible to adjust an amount of supply of the magnetic material X from the magnetic material supply apparatus 342 to the magnetic material storage unit 341 and optimally adjust magnetic resistance between the power supply coil 315 and the power receiving coil 351.

In addition, the wireless power supply system 301 of this embodiment includes a retrieving valve 343. Thus, it is possible to retrieve or decrease the magnetic material X stored in the magnetic material storage unit 341.

In addition, in the wireless power supply system 301 of this embodiment, the magnetic material storage unit 341 is a bag (magnetic material storage bag) which expands and contracts along with the balloon 320. Thus, it is possible to prevent the magnetic material storage unit 341 from interfering with the expansion and contraction of the balloon 320.

Ninth Embodiment

Next, the ninth embodiment of the present disclosure will be described. Also, in description of this ninth embodiment, similar parts to the above-described eighth embodiment will be omitted or simplified.

Figure 17A:
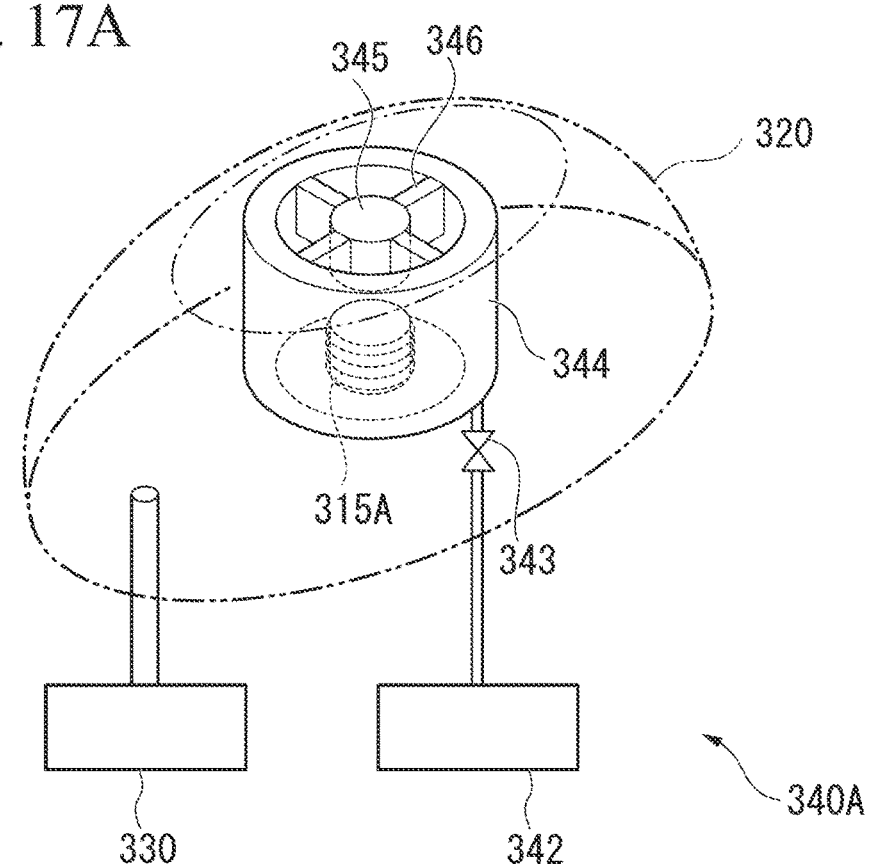
FIG. 17A is an enlarged schematic diagram including a magnetic material unit provided in the wireless power supply system according to a ninth embodiment of the present disclosure.

FIG. 17A is an enlarged schematic diagram including a magnetic material unit 340A provided in the wireless power supply system of this embodiment. In this embodiment, a power supply coil 315A including a so-called circular type coil of which a winding axis direction is a vertical direction is installed. In addition, in this embodiment, the magnetic material unit 340A includes a first magnetic material storage unit 344 erected to surround the power supply coil 315A during expansion, a second magnetic material storage unit 345 disposed above the power supply coil 315A during the expansion, and a connection unit 346 configured to connect the first magnetic material storage unit 344 and the second magnetic material storage unit 345. Also, the insides of the first magnetic material storage unit 344 and the second magnetic material storage unit 345 communicate with each other via the inside of the connection unit 346. Also, in this embodiment, as shown in FIG. 17B, a power receiving coil 351A mounted in the vehicle M is also a so-called circular type coil of which the winding axis direction is a vertical direction.

Figure 17B:
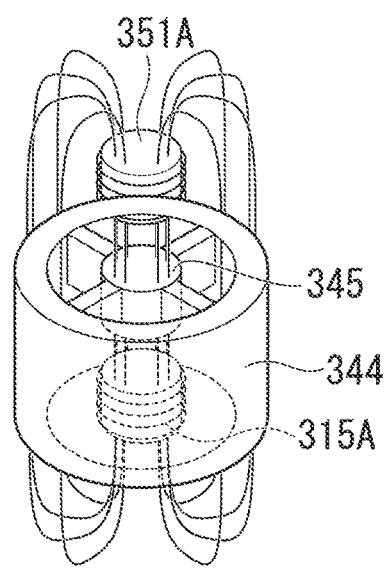
FIG. 17B is a schematic diagram showing a magnetic path formed between the power supply coil and the power receiving coil of the wireless power system according to the ninth embodiment of the present disclosure.

In the wireless power supply system of this embodiment having the above-described configuration, as shown in FIG. 17B, the first magnetic material storage unit 344 and the second magnetic material storage unit 345 are disposed in the magnetic path formed between the power supply coil 315A and the power receiving coil 351A. The magnetic material X is supplied from a magnetic material supply apparatus 342 to the first magnetic material storage unit 344 and the second magnetic material storage unit 345. Thus, even in the wireless power supply system of this embodiment, as in the above-described eighth embodiment, the magnetic resistance between the power supply coil 315A and the power receiving coil 351A decreases and it is possible to transmit much power even when the distance between the power supply coil 315A and the power receiving coil 351A is long.

In the above-described eighth and ninth embodiments, a balloon and a gas supply and exhaust apparatus may be further provided on the side of the power supply coil 315. In addition, a communication antenna may be installed within the balloon 320. In addition, by supplying a powder inside the expanded balloon 320 and then suctioning the gas within the balloon 320, the balloon 320 and the power receiving coil 351 or 351A may be rigidly fixed through a jamming transition phenomenon.

In addition, a configuration in which the movable object of the present disclosure is a vehicle has been described in the above-described eighth and ninth embodiments. However, the present disclosure is not limited thereto and the movable object of the present disclosure may be an underwater movable object.

While preferred embodiments of the disclosure have been described and shown above, it should be understood that these are exemplary of the disclosure and are not to be considered as limiting. It should be noted that operation steps, shapes of constitutional elements, combinations of constitutional elements and the like shown in the above-described embodiment are examples, and it is possible to make various changes within a scope of the present disclosure based on, for example, requirements regarding design issues.

INDUSTRIAL APPLICABILITY

According to the present disclosure, it is possible to realize long distance transmission of power without increasing cost and size of a wireless power supply system.

In addition, it is possible to wirelessly supply power more efficiently than in the past.

In addition, a power supply coil and a power receiving coil can be disposed to face each other at a distance at which power transmission efficiency becomes high. In addition, the reduction of cost and the simplification of a configuration of a vehicle are possible without providing a vehicle height adjustment mechanism. In addition, there is no case in which a height sensor is contaminated or damaged by foreign objects such as dirty mud or stones.

In addition, much power can be transmitted by appropriately adjusting impedance of a wireless power supply system even when a distance between a power supply coil and a power receiving coil is long.

The invention claimed is:

1. A wireless power supply system including a power supply coil disposed on the ground and configured to wirelessly supply power from the power supply coil to a power receiving coil disposed above the power supply coil, the wireless power supply system comprising:
    a first bag on which the power supply coil is mounted and configured to expand or contract to adjust a vertical position of the power supply coil; and
    a second bag provided to cover both the power supply coil and the first bag and configured to expand to occupy a space between the power supply coil and the power receiving coil.

2. The wireless power supply system according to claim 1, comprising:
    a gas supply and exhaust apparatus configured to individually perform supply of a gas to the first bag, supply of the gas to the second bag, exhaust of the gas from the first bag, and exhaust of the gas from the second bag.

3. The wireless power supply system according to claim 2, wherein the gas supply and exhaust apparatus finely adjusts the vertical position of the power supply coil by finely adjusting an amount of the gas supplied to the first bag and an amount of the gas exhausted from the first bag.

4. The wireless power supply system according to claim 2, wherein the gas supply and exhaust apparatus starts the supply of the gas to the first bag after a start of the supply of the gas to the second bag when the first bag is expanded and starts the exhaust of the gas from the second bag after a start of the exhaust of the gas from the first bag when the first bag is contracted.

5. The wireless power supply system according to claim 1, comprising:
   an auxiliary bag configured to abut a periphery of the first bag and expand or contract to adjust a position within a horizontal plane of the power supply coil.

6. The wireless power supply system according to claim 5, comprising:
   a hold mechanism configured to hold the auxiliary bag in the ground when the first bag is contracted and cause the auxiliary bag held in the ground to appear on the ground when the first bag is expanded.

* * * * *